US012637525B2

(12) United States Patent
Park et al.

(10) Patent No.: US 12,637,525 B2
(45) Date of Patent: May 26, 2026

(54) CATALYST COMPRISING MIXED TRANSITION METAL COMPOUNDS, POLYOLEFIN PREPARED USING THE SAME, AND PROCESSES FOR PREPARING THE SAME

(71) Applicant: HANWHA SOLUTIONS CORPORATION, Seoul (KR)

(72) Inventors: Hye Ran Park, Daejeon (KR); Ranwha Park, Daejeon (KR); Sung Dong Kim, Daejeon (KR); Junho Seo, Daejeon (KR); Munhee Lee, Daejeon (KR); Won Jong Lee, Daejeon (KR); Ui Gap Joung, Daejeon (KR); Taeho Jeong, Daejeon (KR); Ji Min Han, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 630 days.

(21) Appl. No.: 18/042,121

(22) PCT Filed: Aug. 4, 2021

(86) PCT No.: PCT/KR2021/010220
§ 371 (c)(1),
(2) Date: Feb. 17, 2023

(87) PCT Pub. No.: WO2022/039418
PCT Pub. Date: Feb. 24, 2022

(65) Prior Publication Data

US 2023/0312773 A1 Oct. 5, 2023

(30) Foreign Application Priority Data

Aug. 20, 2020 (KR) ........................ 10-2020-0104385

(51) Int. Cl.
*C08F 4/76* (2006.01)
*C08F 4/659* (2006.01)
(Continued)

(52) U.S. Cl.
CPC ...... *C08F 4/65912* (2013.01); *C08F 4/65916* (2013.01); *C08F 210/02* (2013.01);
(Continued)

(58) Field of Classification Search
None
See application file for complete search history.

(56) References Cited

U.S. PATENT DOCUMENTS

| | | | |
|---|---|---|---|
| 4,935,474 | A | 6/1990 | Ewen et al. |
| 5,272,236 | A | 12/1993 | Lai et al. |

(Continued)

FOREIGN PATENT DOCUMENTS

| | | | |
|---|---|---|---|
| CN | 111051353 | A | 4/2020 |
| EP | 1 033 371 | A1 | 9/2000 |

(Continued)

OTHER PUBLICATIONS

Chinese Office Action dated Nov. 22, 2023 in Chinese Application No. 202180051019.7.

(Continued)

*Primary Examiner* — Richard A. Huhn
(74) *Attorney, Agent, or Firm* — Sughrue Mion, PLLC

(57) ABSTRACT

A catalyst containing mixed transition metal compounds is disclosed. The catalyst is capable of producing various polyolefins having excellent processability and mechanical properties. A polyolefin prepared using the catalyst and processes for preparing the polyolefin are disclosed. In the preparation process, it is possible to conveniently prepare a
(Continued)

catalyst for olefin polymerization including mixed transition metal compounds by readily adjusting the ratio of the transition metal compounds.

20 Claims, 1 Drawing Sheet

(51) Int. Cl.

| | |
|---|---|
| ***C08F 210/02*** | (2006.01) |
| *C08F 4/60* | (2006.01) |
| *C08F 4/6192* | (2006.01) |
| *C08F 4/62* | (2006.01) |
| *C08F 4/622* | (2006.01) |
| *C08F 4/64* | (2006.01) |
| *C08F 4/642* | (2006.01) |

(52) U.S. Cl.

CPC ...... *C08F 4/60089* (2013.01); *C08F 4/61925* (2013.01); *C08F 4/62089* (2013.01); *C08F 4/6228* (2013.01); *C08F 4/64089* (2013.01); *C08F 4/6428* (2013.01); *C08F 4/76* (2013.01)

(56) References Cited

U.S. PATENT DOCUMENTS

| | | | | |
|---|---|---|---|---|
| 6,828,394 | B2 | 12/2004 | Vaughan et al. | |
| 6,841,631 | B2 | 1/2005 | Loveday et al. | |
| 6,894,128 | B2 | 5/2005 | Loveday et al. | |
| 2007/0043248 | A1 | 2/2007 | Wu et al. | |
| 2011/0275772 | A1 | 11/2011 | Savatsky et al. | |
| 2012/0059134 | A1* | 3/2012 | Yang | C08F 4/65904 502/103 |
| 2020/0048383 | A1 | 2/2020 | Hule et al. | |

FOREIGN PATENT DOCUMENTS

| | | | | |
|---|---|---|---|---|
| EP | 2 017 302 | B1 | 10/2010 | |
| JP | 2003-513114 | A | 4/2003 | |
| JP | 2015-113282 | A | 6/2015 | |
| KR | 10-2004-0076965 | A | 9/2004 | |
| KR | 10-1437509 | B1 | 9/2014 | |
| KR | 10-2017-0075530 | A | 7/2017 | |
| KR | 10-1797890 | B1 | 11/2017 | |
| WO | 00/35964 | A1 | 6/2000 | |
| WO | 2012/033670 | A1 | 3/2012 | |
| WO | 2013/070602 | A1 | 5/2013 | |
| WO | 2014/088938 | A1 | 6/2014 | |
| WO | 2019/046085 | A1 | 3/2019 | |
| WO | WO-2019241045 | A1 * | 12/2019 | C08J 5/18 |

OTHER PUBLICATIONS

International Search Report of PCT/KR2021/010220 dated Nov. 30, 2021 [PCT/ISA/210].

Written Opinion by International Searching Authority PCT/KR2021/010220 dated Nov. 30, 2021 [PCT/ISA/237].

Communication issued Nov. 26, 2024 in European application No. 21858505.7.

Wolczanski et al., "Alkyl and Hydride Derivatives of (Pentamethylcyclopentadienyl)zirconium(IV)", Organmetallics, vol. 1, 1982, pp. 793-799.

Japanese Office Action issued Mar. 5, 2024 in Application No. 2023-512360.

* cited by examiner

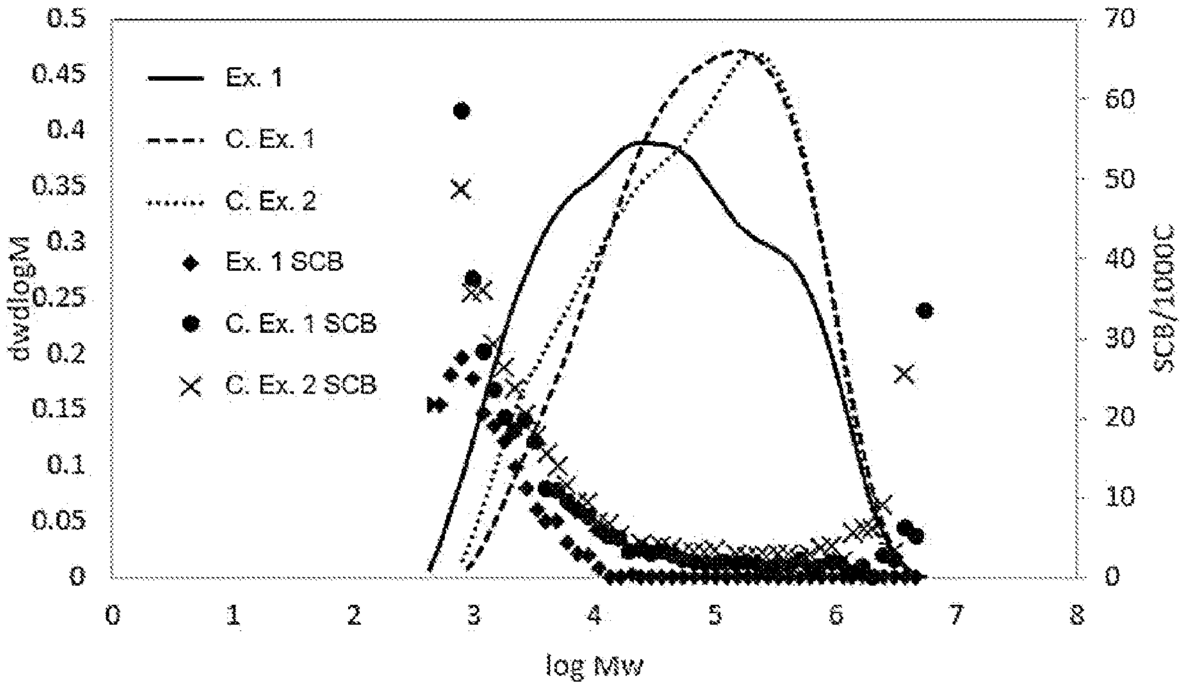
0.5
0.45
0.4
0.35
0.3
0.25
0.2
0.15
0.1
0.05
0
dwdlogM
70
60
50
40
30
20
10
0
SCB/1000C
0 1 2 3 4 5 6 7 8
log Mw
Ex. 1
C. Ex. 1
C. Ex. 2
Ex. 1 SCB
C. Ex. 1 SCB
C. Ex. 2 SCB

CATALYST COMPRISING MIXED TRANSITION METAL COMPOUNDS, POLYOLEFIN PREPARED USING THE SAME, AND PROCESSES FOR PREPARING THE SAME

CROSS REFERENCE TO RELATED APPLICATIONS

This application is a National Stage of International Application No. PCT/KR2021/010220 filed on Aug. 4, 2021, claiming priority based on Korean Patent Application No. 10-2020-0104385 filed on Aug. 20, 2020.

TECHNICAL FIELD

The present invention relates to a catalyst that comprises mixed transition metal compounds and is capable of producing various polyolefins having excellent processability and mechanical properties, to a polyolefin prepared using the same, and processes for preparing the same.

BACKGROUND ART

Polyolefins are widely used in real life as materials for shopping bags, greenhouses, fishing nets, cigarette packages, instant noodle packages, yogurt bottles, battery cases, automobile bumpers, interior parts, shoe soles, washing machines, and the like.

Conventionally, polyolefins such as polyethylene, polypropylene, and ethylene-alpha olefin copolymers and their copolymers have been prepared using a heterogeneous catalyst such as a Ziegler-Natta catalyst made of a titanium compound and an alkyl aluminum compound.

In recent years, a method for preparing polyolefin using a metallocene catalyst, which is a homogeneous catalyst with a very high catalytic activity, has been studied. A metallocene catalyst is a compound in which a ligand such as cyclopentadienyl, indenyl, and cycloheptadienyl is coordinated to a transition metal or a transition metal halide compound. It has a sandwich structure in its basic form. Here, it has various molecular structures depending on the type of ligand and the type of core metal.

In a Ziegler-Natta catalyst as a heterogeneous catalyst, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics.

In general, since a metallocene catalyst has no activity as a polymerization catalyst by itself, it is used together with a cocatalyst such as methyl aluminoxane. The metallocene catalyst is activated as a cation by the action of the cocatalyst. At the same time, the cocatalyst as an anion that is not coordinated with the metallocene catalyst stabilizes the unsaturated cationic active species to form a catalyst system having activity in the polymerization of various olefins.

Such a metallocene catalyst has advantages in that copolymerization is readily carried out, the three-dimensional structure of a polymer can be controlled according to the symmetry of the catalyst, and the polymer prepared thereby has a narrow molecular weight distribution with uniform distribution of a comonomer.

On the other hand, the polymers prepared by a metallocene catalyst have a shortcoming in that it has low processability despite excellent mechanical strength due to a narrow molecular weight distribution. In order to solve this problem, various methods such as changing the molecular structure of a polymer or broadening the molecular weight distribution thereof have been proposed. For example, U.S. Pat. No. 5,272,236 discloses a catalyst for introducing a long chain branch (LCB) as a side branch to the main chain of a polymer to improve the processability of the polymer; however, the supported catalyst has a disadvantage of low activity.

In order to solve this problem of a single metallocene catalyst and to develop a catalyst with excellent activity and improved processability in a convenient way, a method of hybrid supporting metallocene catalysts (different metallocene catalysts) having different properties is proposed. For example, U.S. Pat. Nos. 4,935,474, 6,828,394, and 6,894,128, Korean Patent No. 1437509, and U.S. Pat. No. 6,841,631 disclose a process for producing a polyolefin having a bimodal molecular weight distribution using catalysts having different reactivities for comonomers. Although the polyolefins having a bimodal molecular weight distribution prepared in this way have improved processability, they have lower homogeneity due to different molecular weight distributions. Thus, there is a problem in that it is difficult to obtain a product having uniform physical properties after processing, and the mechanical strength is deteriorated.

Meanwhile, Korean Patent No. 1797890 discloses a hybrid metallocene catalyst in which a first transition metal compound containing a cyclopentadienyl group and an indenyl group, which are not connected by a bridge, and a second transition metal compound containing a substituted bisindenyl group connected by a silyl bridge are mixed.

In addition, in order to solve the problem of a hybrid supported catalyst of different metallocene compounds, a method of using a heteronuclear metallocene catalyst having two active sites have been proposed. For example, Korean Laid-open Patent Publication No. 2004-0076965 discloses a method for controlling molecular weight distribution and molecular weight by using a binuclear metallocene catalyst on a carrier; however, there is a disadvantage of low activity.

DETAILED DESCRIPTION OF THE INVENTION

Technical Problem

An object of the present invention is to provide a process for preparing a catalyst for olefin polymerization comprising mixed transition metal compounds by readily adjusting the ratio of the transition metal compounds.

Another object of the present invention is to provide a catalyst for olefin polymerization, which is prepared by the above preparation process and is capable of producing various polyolefins having excellent processability and mechanical properties.

Still another object of the present invention is to provide a process for preparing a polyolefin using the catalyst.

Still another object of the present invention is to provide a polyolefin prepared using the catalyst.

Technical Solution

According to an embodiment of the present invention, there is provided a process for preparing a catalyst for olefin polymerization, which comprises (1) dissolving a compound represented by Formula 1 and a compound represented by Formula 2 in a solvent; (2) adding a compound represented by Formula 3 to the solution obtained in step (1) and reacting it under stirring to obtain a mixture of transition metal compounds represented by Formulae 4 and 5; and (3) activating the mixture of transition metal compounds obtained in step (2) and a transition metal compound represented by Formula 6 with a cocatalyst compound.

[Formula 1]

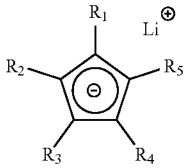

[Formula 2]

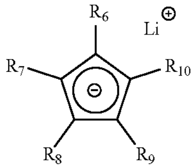

[Formula 3]

$MX_4$

[Formula 4]

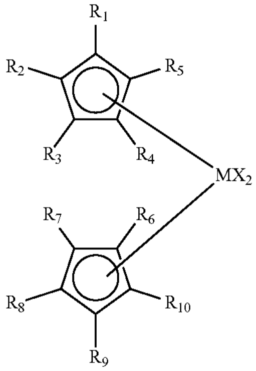

[Formula 5]

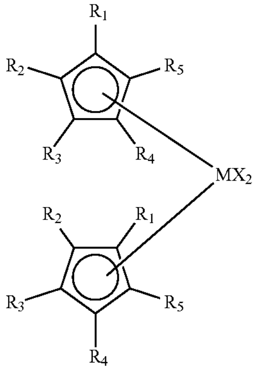

[Formula 6]

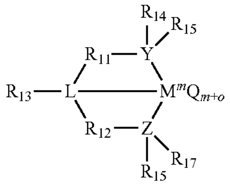

In Formulae 1 to 6, $R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl, wherein $R_1$ to $R_5$ and $R_6$ to $R_{10}$ are each independently capable of being linked to an adjacent group to form a substituted or unsubstituted, saturated or unsaturated $C_{4-20}$ ring, M is each titanium (Ti), zirconium (Zr), or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, Q is an anionic leaving group and is each independently hydrogen, hydrocarbyl, heteroatom or halogen, a straight or branched chain alkyl radical, an alkenyl radical, an alkynyl radical, a cycloalkyl radical or an aryl radical, an acyl radical, an aroyl radical, an alkoxy radical, an aryloxy radical, an alkylthio radical, a dialkylamino radical, an alkoxycarbonyl radical, an aryloxycarbonyl radical, a carbomoyl radical, an alkyl- or dialkyl-carbamoyl radical, an acyloxy radical, an acylamino radical, an aroylamino radical, a straight-chain, branched-chain or cyclic alkylene radical, or a combination thereof, m is the oxidation state of M and is +3, +4, or +5, is the formal charge of the YZL ligand and is 0, −1, −2, or −3, L is a group 15 or 16 element, preferably nitrogen, Y is a group 15 element, preferably nitrogen or phosphorus, more preferably nitrogen, Z is a group 15 element, preferably nitrogen or phosphorus, more preferably nitrogen, $R_{11}$ and $R_{12}$ are each independently a $C_{1-20}$ hydrocarbon group or a heteroatom-containing group, wherein the hetero atom is silicon, germanium, tin, lead, or phosphorus, or $R_{11}$ and $R_{12}$ are capable of being linked to each other, $R_{13}$ is absent or is hydrogen, $C_{1-20}$ alkyl, halogen, or a heteroatom-containing group, $R_{14}$ and $R_{15}$ are each independently an alkyl group, an aryl group, a substituted aryl group, a cyclic alkyl group, a substituted cyclic alkyl group, or a multiple ring system, and $R_{16}$ and $R_{17}$ are each independently absent, or hydrogen, an alkyl group, a halogen, a heteroatom, a hydrocarbyl group, or a heteroatom-containing group.

In a specific embodiment, $R_1$ to $R_5$ and $R_6$ to $R_{10}$ may each be hydrogen, substituted or unsubstituted $C_{1-20}$ alkyl, substituted or unsubstituted $C_{2-20}$ alkenyl, or substituted or unsubstituted $C_{6-20}$ aryl.

In addition, in a specific embodiment, $R_1$ to $R_5$ and $R_6$ to $R_{10}$ may each be substituted with at least one of halogen, $C_{1-20}$ alkylsilyl, and $C_{1-20}$ alkenyloxy.

In a more specific embodiment, the compound represented by Formula 1 is at least one of the compounds represented by Formulae 1-1 to 1-21, and the compound represented by Formula 2 is at least one of the compounds represented by Formulae 2-1 to 2-7.

[Formula 1-1]

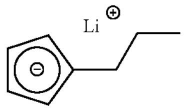

-continued
[Formula 1-2]
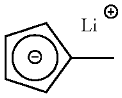
[Formula 1-3]
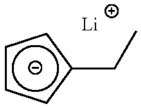
[Formula 1-4]
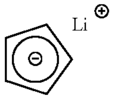
[Formula 1-5]
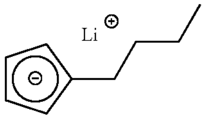
[Formula 1-6]
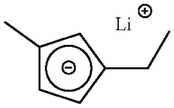
[Formula 1-7]
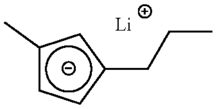
[Formula 1-8]
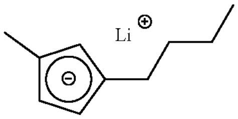
[Formula 1-9]
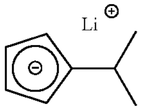
[Formula 1-10]
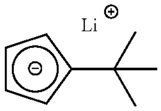
[Formula 1-11]
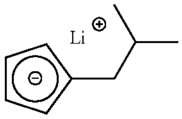
[Formula 1-12]
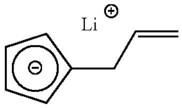
[Formula 1-13]
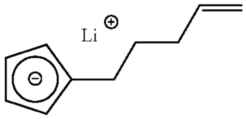
[Formula 1-14]
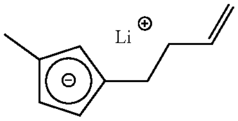
-continued
[Formula 1-15]
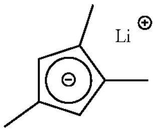
[Formula 1-16]
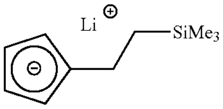
[Formula 1-17]
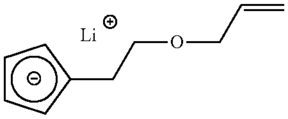
[Formula 1-18]
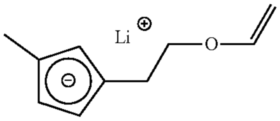
[Formula 1-19]
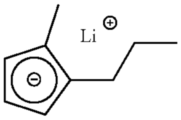
[Formula 1-20]
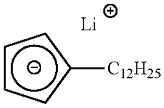
[Formula 1-21]
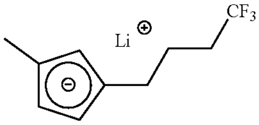
[Formula 2-1]
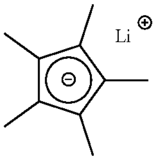
[Formula 2-2]
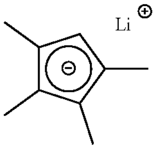
[Formula 2-3]
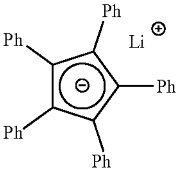
[Formula 2-4]
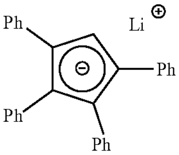

-continued

[Formula 2-5]

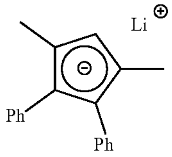

[Formula 2-6]

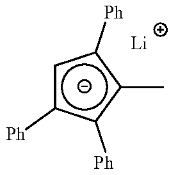

[Formula 2-7]

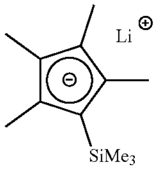

In the above formulae, Me is methyl, and Ph is phenyl.

In a specific embodiment, the solvent may comprise at least one selected from the group consisting of hexane, pentane, toluene, benzene, dichloromethane, diethyl ether, tetrahydrofuran, acetone, and ethyl acetate.

In a specific embodiment, in step (1), the molar ratio of the compound represented by Formula 1 to the compound represented by Formula 2 is in the range of 1:100 to 100:1.

In a specific embodiment, in Formula 3, M is zirconium or hafnium, and X is each halogen or $C_{1-20}$ alkyl.

In a more specific embodiment, the compound represented by Formula 3 is $ZrCl_4$ or $HfCl_4$.

In a specific embodiment, in step (2), the reaction temperature is 0° C. to 120° C., and the reaction time is 1 to 72 hours.

In a specific embodiment, the transition metal compound represented by Formula 4 is at least one of the transition metal compounds represented by Formulae 4-1 to 4-21, and the transition metal compound represented by Formula 5 is at least one of the transition metal compounds represented by Formulae 5-1 to 5-21.

[Formula 4-1]

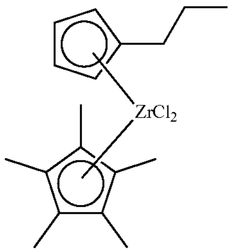

[Formula 4-2]

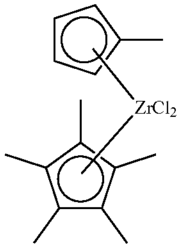

-continued

[Formula 4-3]

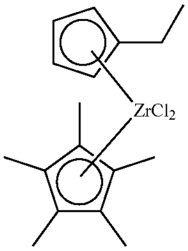

[Formula 4-4]

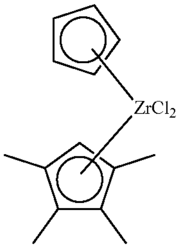

[Formula 4-5]

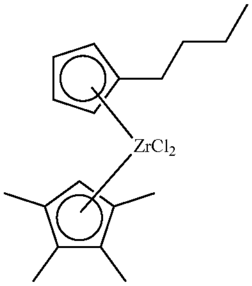

[Formula 4-6]

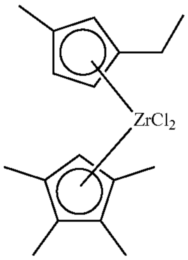

[Formula 4-7]

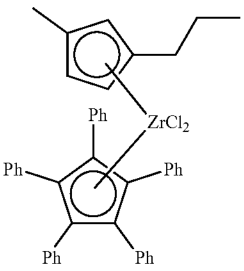

[Formula 4-8]

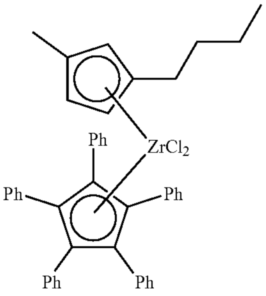

[Formula 4-9]
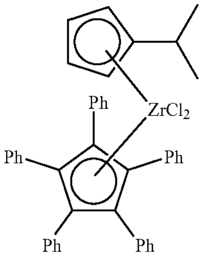
[Formula 4-10]
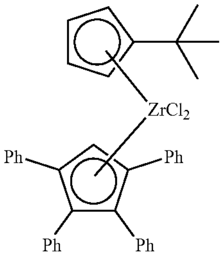
[Formula 4-11]
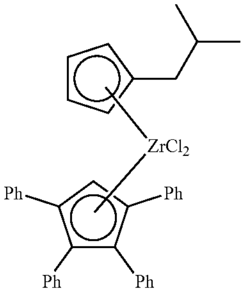
[Formula 4-12]
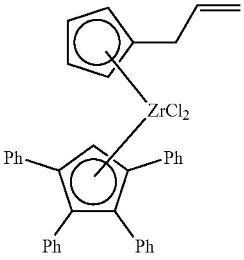
[Formula 4-13]
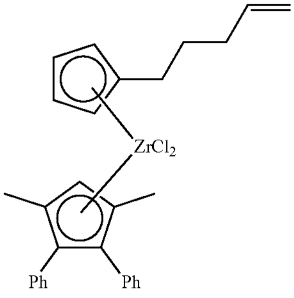
[Formula 4-14]
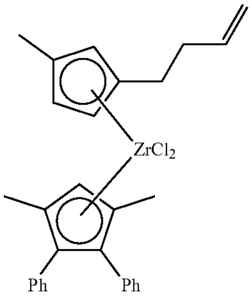
[Formula 4-15]
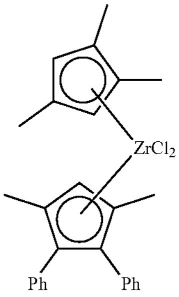
[Formula 4-16]
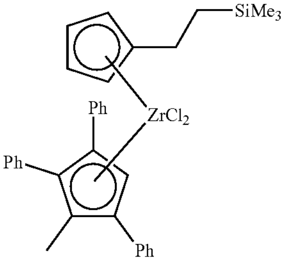
[Formula 4-17]
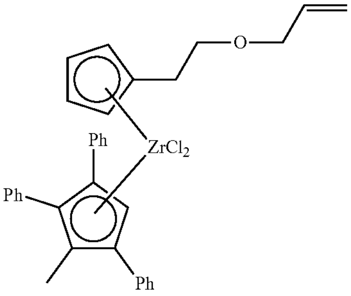
[Formula 4-18]
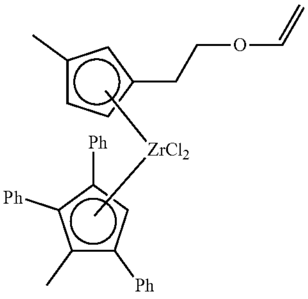

-continued
[Formula 4-19]
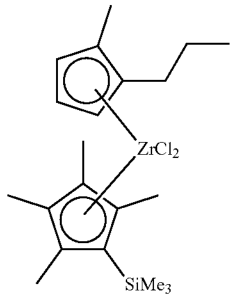
[Formula 4-20]
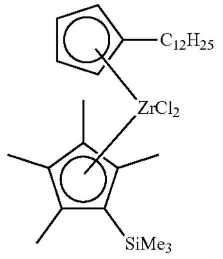
[Formula 4-21]
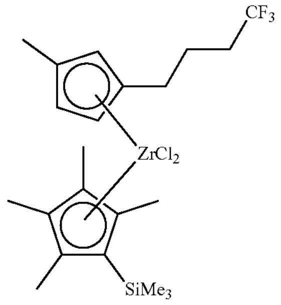
[Formula 5-1]
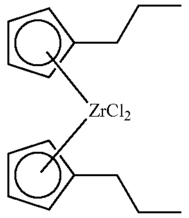
[Formula 5-2]
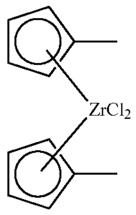
[Formula 5-3]
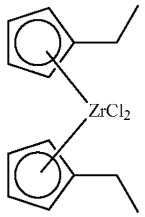
-continued
[Formula 5-4]
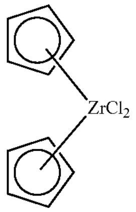
[Formula 5-5]
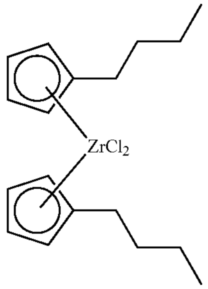
[Formula 5-6]
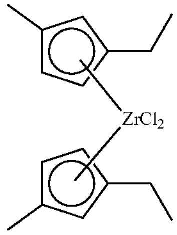
[Formula 5-7]
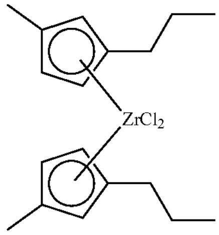
[Formula 5-8]
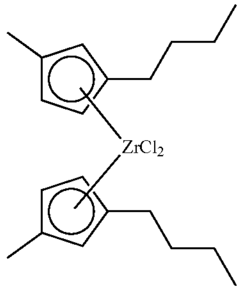
[Formula 5-9]
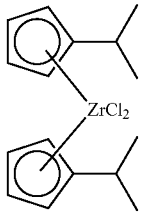

-continued
[Formula 5-10]
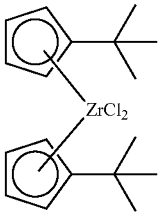
[Formula 5-11]
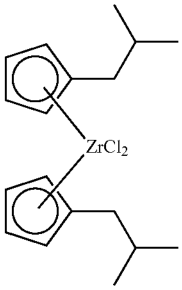
[Formula 5-12]
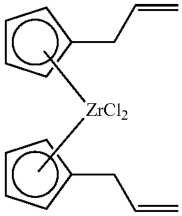
[Formula 5-13]
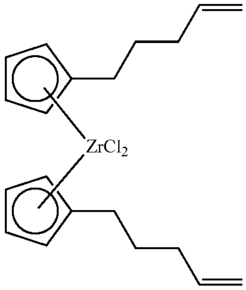
[Formula 5-14]
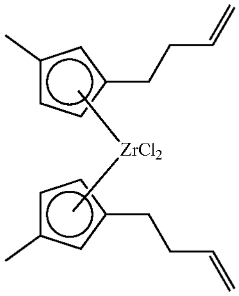
[Formula 5-15]
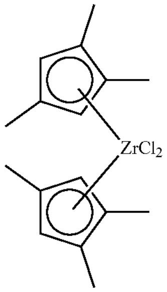
-continued
[Formula 5-16]
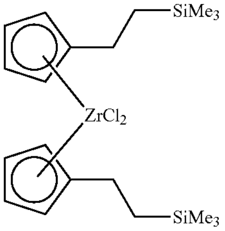
[Formula 5-17]
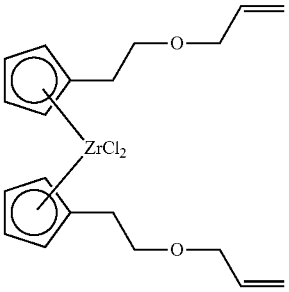
[Formula 5-18]
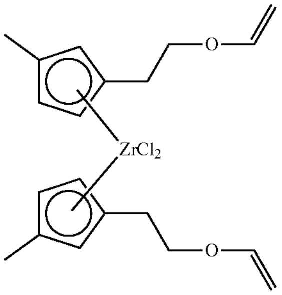
[Formula 5-19]
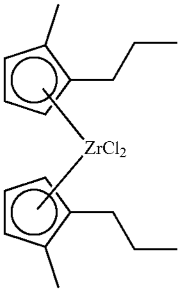
[Formula 5-20]
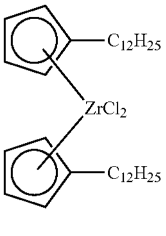

-continued

[Formula 5-21]

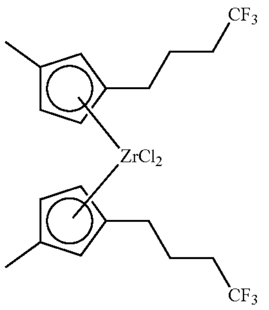

In the above formulae, Me is methyl, and Ph is phenyl.

In a specific embodiment, the molar ratio of the compound represented by Formula 4 to the compound represented by Formula 5 in the mixture of transition metal compounds obtained in step (2) is in the range of 1:100 to 100:1.

In a specific embodiment, the process for preparing a catalyst may further comprise (2') drying the mixture of transition metal compounds obtained in step (2).

In a specific embodiment, the process for preparing a catalyst may further comprise (2") dissolving the dried mixture of transition metal compounds obtained in step (2') in a solvent and then removing unreacted substances and/or impurities with a filter.

In a specific embodiment, in Formula 6, M is zirconium or hafnium, Q is each independently hydrogen, a halogen, or a hydrocarbyl group, $R_{11}$ and $R_{12}$ are each independently a $C_{1-6}$ hydrocarbon group, $R_{13}$ is hydrogen or methyl, and $R_{14}$ and $R_{15}$ are each independently a substituted aryl group.

In a more specific embodiment, the transition metal compound represented by Formula 6 may be a compound represented by Formula 6-1.

[Formula 6-1]

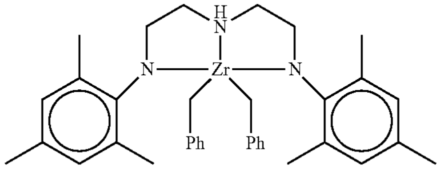

In a specific embodiment, the cocatalyst compound may comprise at least one selected from the group consisting of a compound represented by Formula 7, a compound represented by Formula 8, and a compound represented by Formula 9.

[Formula 7]

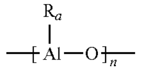

[Formula 8]

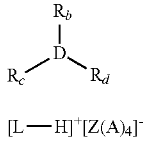

[Formula 9]

$$[L-H]^+[Z(A)_4]^- \text{ or } [L]^+[Z(A)_4]^-$$

In Formula 7, n is an integer of 2 or more, and $R_a$ may each independently be a halogen atom, $C_{1-20}$ hydrocarbon, or $C_{1-20}$ hydrocarbon substituted with halogen.

In Formula 8, D is aluminum (Al) or boron (B), and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy.

In Formula 9, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

In a more specific embodiment, the compound represented by Formula 7 is at least one selected from the group consisting of methylaluminoxane, ethylaluminoxane, isobutylaluminoxane, and butylaluminoxane.

In addition, the compound represented by Formula 8 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 9 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl) borate, tributylammonium tetra(p-trifluoromethylphenyl) borate, trimethylammonium tetra(p-trifluoromethylphenyl) borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, triphenylcarbonium tetra(p-trifluoromethylphenyl)borate, and triphenylcarbonium tetrapentafluorophenylborate.

In a specific embodiment, the process for preparing a catalyst may further comprise (3') supporting some or all of the transition metal compounds represented by Formulae 4 to 6 and the cocatalyst compound on a carrier before or after step (3).

In a specific embodiment, the carrier comprises at least one selected from the group consisting of silica, alumina, and magnesia.

According to an embodiment of the present invention, there is provided a catalyst for olefin polymerization, which is prepared by the preparation process according to the embodiment of the present invention and comprises transition metal compounds represented by Formulae 4 to 6; and a cocatalyst compound comprising at least one selected from the group consisting of compounds represented by Formulae 7 to 9.

In a specific embodiment, the catalyst for olefin polymerization may further comprise a carrier for supporting some or all of the transition metal compounds represented by Formulae 4 to 6 and the cocatalyst compound comprising at least one selected from the group consisting of compounds represented by Formulae 7 to 9.

According to an embodiment of the present invention, there is provided a process for preparing a polyolefin, which comprises (1) dissolving a compound represented by Formula 1 and a compound represented by Formula 2 in a solvent; (2) adding a compound represented by Formula 3 to the solution obtained in step (1) and reacting it under stirring to obtain a mixture of transition metal compounds represented by Formulae 4 and 5; (3) activating the mixture of transition metal compounds obtained in step (2) and a transition metal compound represented by Formula 6 with a cocatalyst compound; (4) supporting some or all of the transition metal compounds represented by Formulae 4 to 6 and the cocatalyst compound on a carrier before or after step (3); and (5) polymerizing an olefin in the presence of the catalyst obtained in step (3) or step (4).

In a specific embodiment, the polymerization of an olefin is a copolymerization of an olefinic monomer and an olefinic comonomer, wherein the olefinic monomer is ethylene, and the olefinic comonomer is 1-hexene.

According to an embodiment of the present invention, there is provided a polyolefin, which is prepared by the preparation process according to the embodiment of the present invention and has (1) a density of 0.940 to 0.970 $g/cm^3$, (2) a melt index ratio ($MI_{21.6}/MI_{21.6}$) of 30 to 200, (3) a weight average molecular weight (Mw) of 80,000 to 600,000 g/mole, and (4) molecular weight distribution (MWD) represented by a polydispersity index (Mw/Mn) of 10 to 50.

Advantageous Effects of the Invention

In the preparation process according to an embodiment of the present invention, it is possible to conveniently prepare a catalyst for olefin polymerization comprising mixed transition metal compounds by readily adjusting the ratio of the transition metal compounds.

In addition, the catalyst for olefin polymerization prepared by the preparation process according to an embodiment of the present invention is capable of producing various polyolefins having excellent processability and mechanical properties.

In addition, in the process for preparing a polyolefin according to an embodiment of the present invention, it is possible to produce various polyolefins having excellent processability and mechanical properties in a simple way.

In particular, the polyolefin prepared by the catalyst according to an embodiment of the present invention may prevent phase separation of the molecular structure and have a bimodal or multi-modal molecular weight distribution.

BRIEF DESCRIPTION OF THE DRAWING

FIG. 1 is a GPC-FTIR graph for measuring the BOCD index of the polyolefins of the Examples and Comparative Examples of the present invention.

BEST MODE FOR CARRYING OUT THE INVENTION

Hereinafter, the present invention will be described in more detail.

Process for Preparing a Catalyst for Olefin Polymerization

There is provided a process for preparing a catalyst for olefin polymerization, which comprises (1) dissolving a compound represented by Formula 1 and a compound represented by Formula 2 in a solvent; (2) adding a compound represented by Formula 3 to the solution obtained in step (1) and reacting it under stirring to obtain a mixture of transition metal compounds represented by Formulae 4 and 5; and (3) activating the mixture of transition metal compounds obtained in step (2) and a transition metal compound represented by Formula 6 with a cocatalyst compound.

Step (1)

In step (1), a compound represented by Formula 1 and a compound represented by Formula 2 are dissolved in a solvent.

[Formula 1]

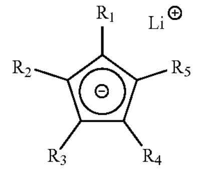

[Formula 2]

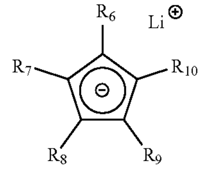

In Formulae 1 and 2, $R_1$ to $R_5$ and $R_6$ to $R_{12}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl. Here, $R_1$ to $R_5$ and $R_6$ to $R_{10}$ are each independently capable of being linked to an adjacent group to form a substituted or unsubstituted saturated or unsaturated $C_{4-20}$ ring.

In a specific embodiment, $R_1$ to $R_5$ and $R_6$ to $R_{10}$ may each be hydrogen, substituted or unsubstituted $C_{1-20}$ alkyl, substituted or unsubstituted $C_{2-20}$ alkenyl, or substituted or unsubstituted $C_{6-20}$ aryl.

In a specific embodiment, $R_1$ to $R_5$ and $R_6$ to $R_{10}$ may each be substituted with at least one of halogen, $C_{1-20}$ alkylsilyl, and $C_{1-20}$ alkenyloxy.

In a more specific embodiment, the compound represented by Formula 1 is at least one of the compounds represented by Formulae 1-1 to 1-21, and the compound represented by Formula 2 is at least one of the compounds represented by Formulae 2-1 to 2-7.

[Formula 1-1]
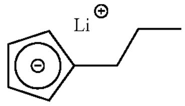
[Formula 1-2]
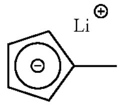
[Formula 1-3]
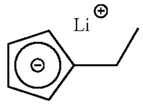
[Formula 1-4]
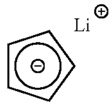
[Formula 1-5]
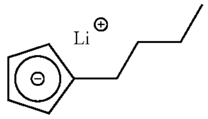
[Formula 1-6]
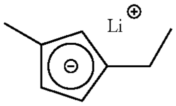
[Formula 1-7]
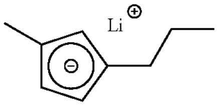
[Formula 1-8]
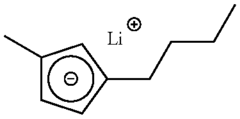
[Formula 1-9]
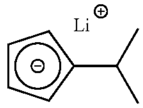
[Formula 1-10]
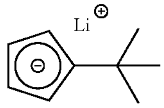
[Formula 1-11]
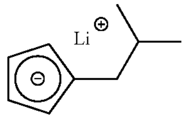
[Formula 1-12]
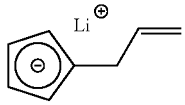
[Formula 1-13]
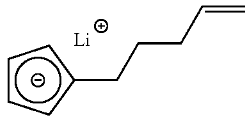
-continued
[Formula 1-14]
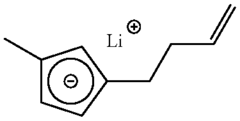
[Formula 1-15]
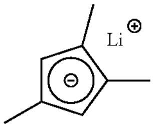
[Formula 1-16]
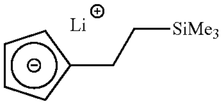
[Formula 1-17]
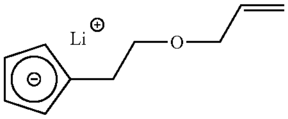
[Formula 1-18]
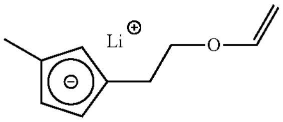
[Formula 1-19]
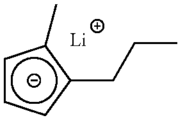
[Formula 1-20]
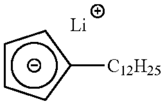
[Formula 1-21]
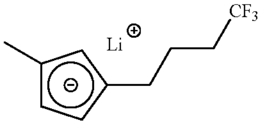
[Formula 2-1]
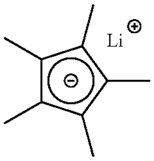
[Formula 2-2]
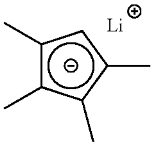
[Formula 2-3]
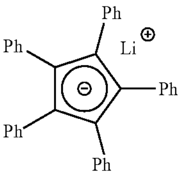

-continued

[Formula 2-4]

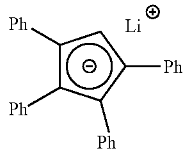

[Formula 2-5]

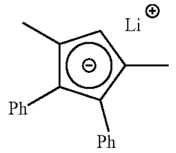

[Formula 2-6]

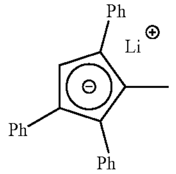

[Formula 2-7]

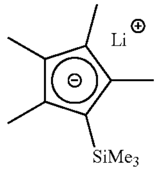

In the above formulae, Me is methyl, and Ph is phenyl.

In a specific embodiment, the solvent may comprise at least one selected from the group consisting of aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran, acetone, and ethyl acetate. Preferably, the solvent may be toluene, but it is not particularly limited thereto.

When the compound represented by Formula 1 and the compound represented by Formula 2 are dissolved in a solvent, the order in which the respective compounds are added is not particularly limited. That is, the compound represented by Formula 1 may be added to a solvent to be dissolved, followed by the addition of the compound represented by Formula 2 to the solvent to be dissolved, or vice versa. In addition, these two compounds may be simultaneously added to a solvent to be dissolved.

When the compound represented by Formula 1 and the compound represented by Formula 2 are dissolved in a solvent, the temperature and dissolution time are not particularly limited. In a specific embodiment, the compound represented by Formula 1 and the compound represented by Formula 2 are added to a solvent, respectively or simultaneously, at a temperature of −78° C. to 80° C., preferably a temperature of −40° C. to 60° C., more preferably room temperature, and stirred to be dissolved for 1 to 24 hours, preferably 5 to 20 hours, more preferably about 15 hours.

In a specific embodiment, in step (1), the molar ratio of the compound represented by Formula 1 to the compound represented by Formula 2 dissolved in a solvent is in the range of 1:100 to 100:1. Preferably, the molar ratio of these two compounds is 1:30 to 30:1. More preferably, the molar ratio of these two compounds is 1:20 to 20:1.

Step (2)

A compound represented by Formula 4 is added to the solution obtained in step (1), which is reacted under stirring to obtain a mixture of transition metal compounds represented by Formulae 4 and 5.

[Formula 3]

$MX_4$

[Formula 4]

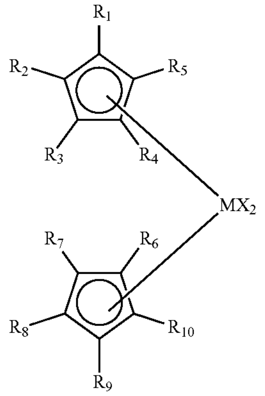

[Formula 5]

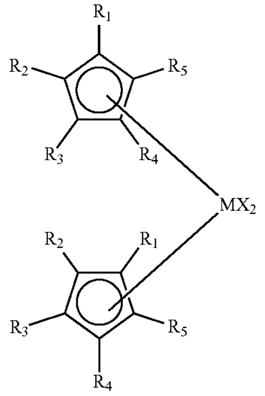

In Formulae 3 to 5, M is titanium (Ti), zirconium (Zr), or hafnium (Hf). Specifically, M may be zirconium or hafnium.

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido. Specifically, X may each be halogen or $C_{1-20}$ alkyl. More specifically, X may each be chlorine.

In Formulae 4 and 5, $R_1$ to $R_5$ and $R_6$ to $R_{10}$ are as described in step (1) above. In a specific embodiment, the compound represented by Formula 3 is $ZrCl_4$ or $HfCl_4$.

In a specific embodiment, the temperature at which the compound represented by Formula 3 is added to the solution obtained in step (1) may be in the range of −78° C. to 30° C. Preferably, the temperature at which the compound represented by Formula 3 is added may be in the range of −40° C. to 10° C. More preferably, the temperature at which the compound represented by Formula 3 is added may be about −30° C.

In a specific embodiment, once the compound represented by Formula 3 has been added, the temperature is gradually raised to a range of 0° C. to 120° C., preferably 25° C. to 100° C., and more preferably about 70° C., and it is stirred for 1 to 72 hours, preferably 5 to 48 hours, and more preferably about 24 hours to carry out the reaction to obtain a mixture of transition metal compounds represented by Formulae 4 and 5.

In a specific embodiment, the transition metal compound represented by Formula 4 is at least one of the transition metal compounds represented by Formulae 4-1 to 4-21, and the transition metal compound represented by Formula 5 is at least one of the transition metal compounds represented by Formulae 5-1 to 5-21.

[Formula 4-1]

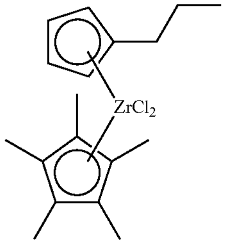

[Formula 4-2]

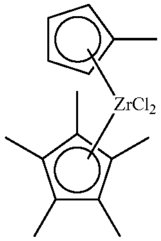

[Formula 4-3]

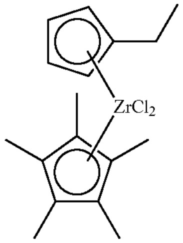

[Formula 4-4]

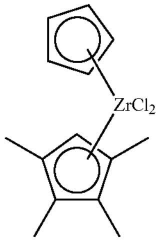

[Formula 4-5]

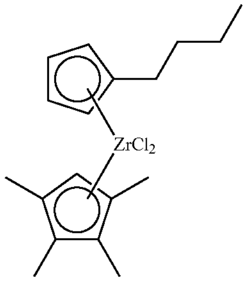

-continued

[Formula 4-6]

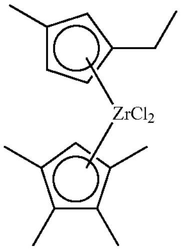

[Formula 4-7]

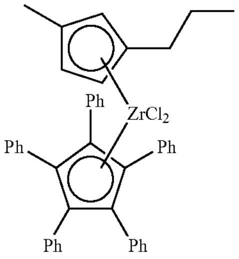

[Formula 4-8]

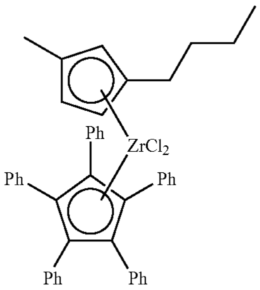

[Formula 4-9]

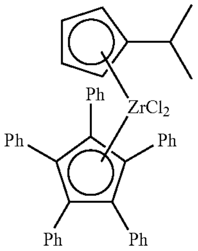

[Formula 4-10]

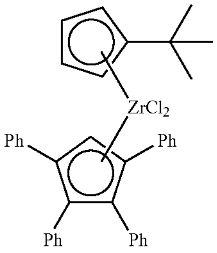

[Formula 4-11]

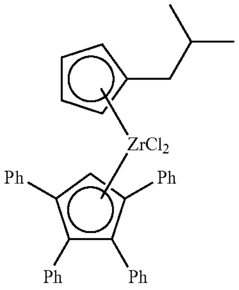

-continued
[Formula 4-12]
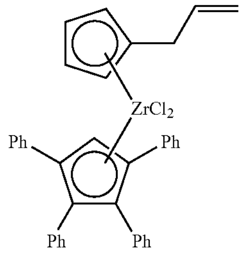
[Formula 4-13]
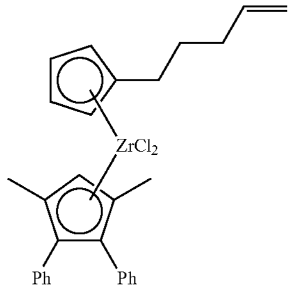
[Formula 4-14]
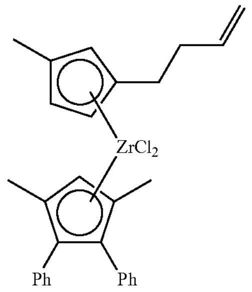
[Formula 4-15]
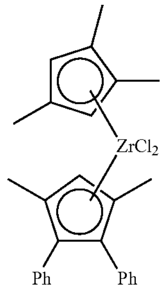
[Formula 4-16]
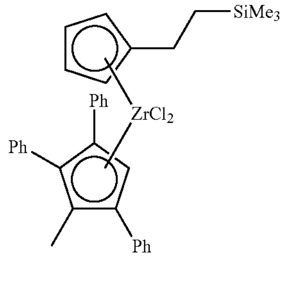
-continued
[Formula 4-17]
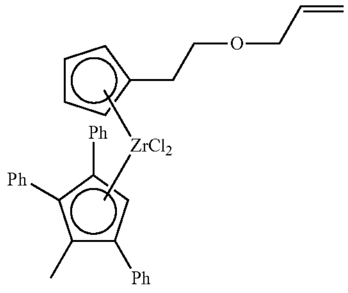
[Formula 4-18]
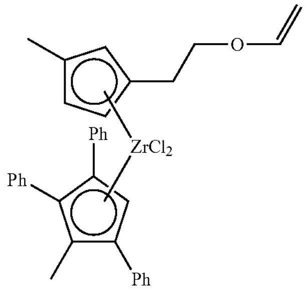
[Formula 4-19]
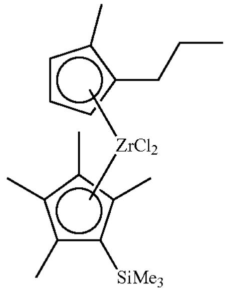
[Formula 4-20]
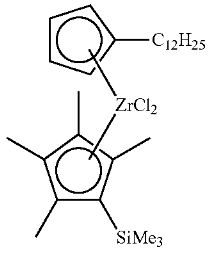
[Formula 4-21]
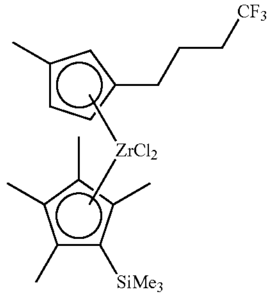
[Formula 5-1]
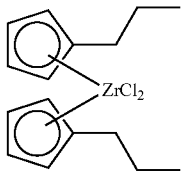

-continued
[Formula 5-2]
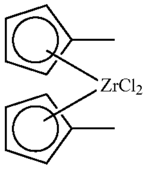
[Formula 5-3]
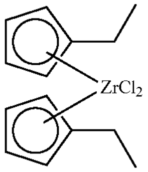
[Formula 5-4]
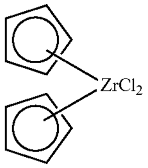
[Formula 5-5]
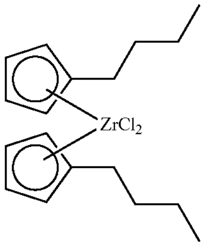
[Formula 5-6]
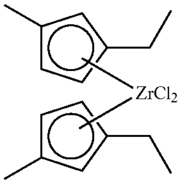
[Formula 5-7]
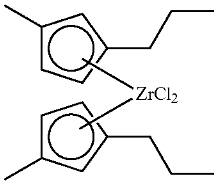
[Formula 5-8]
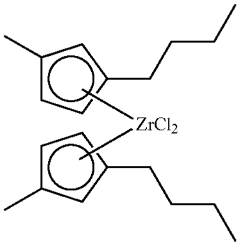
[Formula 5-9]
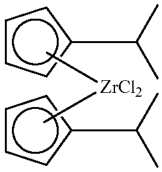
-continued
[Formula 5-10]
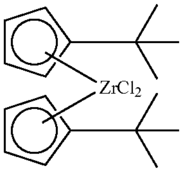
[Formula 5-11]
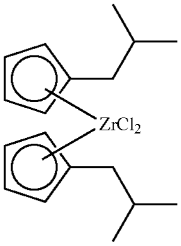
[Formula 5-12]
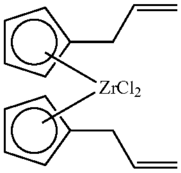
[Formula 5-13]
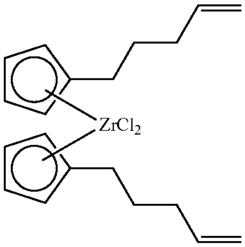
[Formula 5-14]
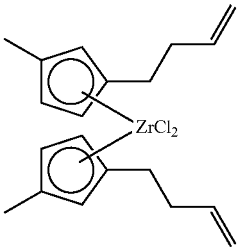
[Formula 5-15]
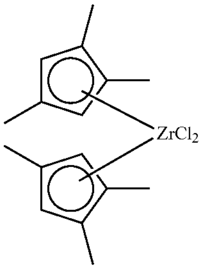
[Formula 5-16]
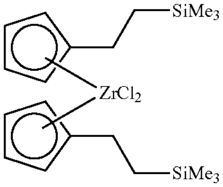

-continued

[Formula 5-17]

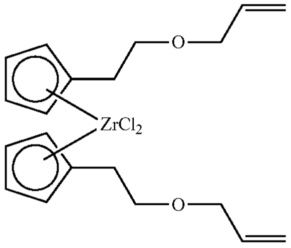

[Formula 5-18]

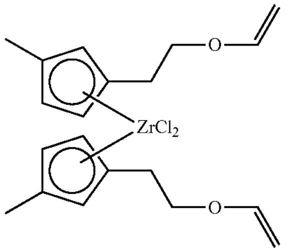

[Formula 5-19]

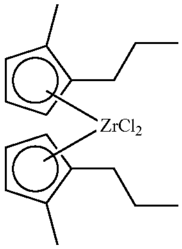

[Formula 5-20]

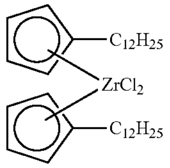

[Formula 5-21]

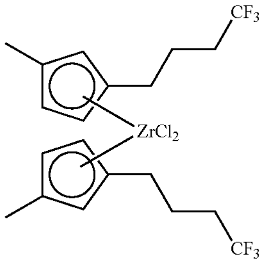

In the above formulae, Me is methyl, and Ph is phenyl.

In a specific embodiment, the molar ratio of the compound represented by Formula 4 to the compound represented by Formula 5 in the mixture of transition metal compounds obtained in step (2) is in the range of 1:100 to 100:1. Preferably, the molar ratio of these two compounds is 1:30 to 30:1. More preferably, the molar ratio of these two compounds is 1:20 to 20:1.

In a specific embodiment, the process for preparing a catalyst of the present invention may further comprise (2') drying the mixture of transition metal compounds obtained in step (2). Here, the drying conditions of the composition are not particularly limited, but it may be carried out in a temperature range of 25° C. to 80° C., preferably in a temperature range of 25° C. to 50° C., and more preferably at a temperature of about 25° C.

In a specific embodiment, the process for preparing a catalyst of the present invention may further comprise (2") dissolving the dried mixture of transition metal compounds obtained in step (2') in a solvent and then removing unreacted substances and/or impurities with a filter. Here, the solvent may be substantially the same as the solvent used in step (1) above. Preferably, dichloromethane may be used, but it is not particularly limited thereto. The filter for removing unreacted substances and/or impurities is not particularly limited, but a Celite filter may preferably be used Step (3)

The mixture of transition metal compounds obtained in step (2) and a transition metal compound represented by Formula 6 are activated with a cocatalyst compound.

[Formula 6]

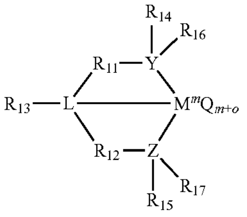

In Formula 6, M is titanium (Ti), zirconium (Zr), or hafnium (Hf). Specifically, M may be zirconium or hafnium.

Q is an anionic leaving group and is each independently hydrogen, hydrocarbyl, heteroatom or halogen, a straight or branched chain alkyl radical, an alkenyl radical, an alkynyl radical, a cycloalkyl radical or an aryl radical, an acyl radical, an aroyl radical, an alkoxy radical, an aryloxy radical, an alkylthio radical, a dialkylamino radical, an alkoxycarbonyl radical, an aryloxycarbonyl radical, a carbomoyl radical, an alkyl- or dialkyl-carbamoyl radical, an acyloxy radical, an acylamino radical, an aroylamino radical, a straight-chain, branched-chain or cyclic alkylene radical, or a combination thereof. Specifically, Q may each independently be a hydrogen, halogen, or a hydrocarbyl group.

m is the oxidation state of M and is +3, +4, or +5.

o is the formal charge of the YZL ligand and is 0, −1, −2, or −3.

L is a group 15 or 16 element, preferably nitrogen.

Y is a group 15 element, preferably nitrogen or phosphorus, more preferably nitrogen.

Z is a group 15 element, preferably nitrogen or phosphorus, more preferably nitrogen.

$R_{11}$ and $R_{12}$ are each independently a $C_{1-20}$ hydrocarbon group or a heteroatom-containing group, wherein the hetero atom is silicon, germanium, tin, lead, or phosphorus, or $R_{11}$ and $R_{12}$ are capable of being linked to each other. Specifically, $R_{11}$ and $R_{12}$ may each independently be a $C_{1-6}$ hydrocarbon group.

$R_{13}$ is absent or is hydrogen, $C_{1-20}$ alkyl, halogen, or a heteroatom-containing group. Specifically, $R_{13}$ may be hydrogen or methyl.

$R_{14}$ and $R_{15}$ are each independently an alkyl group, an aryl group, a substituted aryl group, a cyclic alkyl group, a substituted cyclic alkyl group, or a multiple ring system. Specifically, $R_{14}$ and $R_{15}$ may each independently be a substituted aryl group.

$R_{16}$ and $R_{17}$ are each independently absent, or hydrogen, an alkyl group, a halogen, a heteroatom, a hydrocarbyl group, or a heteroatom-containing group.

In a specific embodiment, in Formula 6, M is zirconium or hafnium, Q is each independently hydrogen, a halogen, or a hydrocarbyl group, $R_{11}$ and $R_{12}$ are each independently a $C_{1-6}$ hydrocarbon group, $R_{13}$ is hydrogen or methyl, and $R_{14}$ and $R_{15}$ are each independently a substituted aryl group.

In a more specific embodiment, in Formula 6, $R_{14}$ and $R_{15}$ are each independently a group represented by Formula 6a.

[Formula 6a]

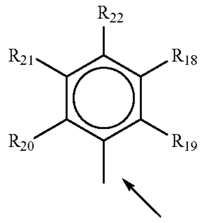

linked to Z or Y

In Formula 6a, $R_{18}$ to $R_{22}$ are each independently hydrogen, a $C_{1-20}$ alkyl group, a hetero atom, or a heteroatom-containing group having up to 40 carbon atoms, and two groups of $R_{18}$ to $R_{22}$ may be fused to form a cyclic group or a heterocyclic group.

In a more specific embodiment, the transition metal compound of Formula 6 may be a compound represented by Formula 6-1.

[Formula 6-1]

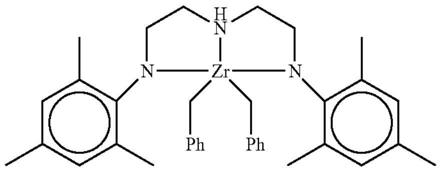

In a specific embodiment, the cocatalyst compound may comprise at least one selected from the group consisting of a compound represented by Formula 7, a compound represented by Formula 8, and a compound represented by Formula 9.

[Formula 7]

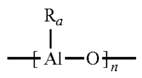

In Formula 7, n is an integer of 2 or more, and $R_a$ may each independently be halogen, $C_{1-20}$ hydrocarbon, or $C_{1-20}$ hydrocarbon substituted with halogen. Specifically, $R_a$ may be methyl, ethyl, n-butyl, or isobutyl.

[Formula 8]

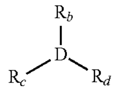

In Formula 8, D is aluminum (Al) or boron (B), and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$$[L\text{-}H]^+[Z(A)_4]^+ \text{ or } [L]^+[Z(A)_4]^-$$ [Formula 9]

In Formula 9, L is a neutral or cationic Lewis acid, $[L\text{-}H]^+$ and $[L]^+$ a Brönsted acid, Z is a group 13 element, and A is each independently substituted or unsubstituted $C_{6-20}$ aryl or substituted or unsubstituted $C_{1-20}$ alkyl. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

In a more specific embodiment, examples of the compound represented by Formula 7 include methylaluminoxane, ethylaluminoxane, isobutylaluminoxane, butylaluminoxane, and the like. Preferred is methylaluminoxane. But it is not limited thereto.

Examples of the compound represented by Formula 8 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 9 include triethylammonium tetraphenylborate, tributylammonium tetraphenylborate, trimethylammonium tetraphenylborate, tripropylammonium tetraphenylborate, trimethylammonium tetra(p-25 tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl) aluminate, triethylammonium tetra(o,p-dimethylphenyl)aluminate, tributylammonium tetra(p-trifluoromethylphenyl) aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, triphenylcarbonium tetra(p-trifluoromethylphenyl)borate, and triphenylcarbonium tetrapentafluorophenylborate.

In a specific embodiment, the process for preparing a catalyst of the present invention may further comprise (3') supporting some or all of the transition metal compounds represented by Formulae 4 to 6 and the cocatalyst compound on a carrier before or after step (3).

Here, the carrier may comprise a material containing a hydroxyl group on its surface. Preferably, a material that has been dried to remove moisture from its surface and has a highly reactive hydroxyl group and a siloxane group may be used. In a specific embodiment, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the transition metal compound and the cocatalyst compound.

The carrier may have an average particle size of 10 to 250 μm, preferably an average particle size of 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, more preferably 200 to 600 $m^2/g$.

In a preferred example, when the carrier is silica, the drying temperature of the silica may be from room temperature to 900° C. The drying temperature may preferably be from room temperature to 800° C., more preferably from room temperature to 700° C. If the drying temperature is lower than room temperature, there would be too much moisture so that the moisture on the surface and the cocatalyst may react. If it exceeds 900° C., the structure of the carrier may collapse.

The dried silica may have a concentration of hydroxy groups of 0.1 to 5 mmoles/g, preferably 0.7 to 4 mmoles/g, and more preferably 1.0 to 2 mmoles/g. If the concentration of hydroxy groups is less than 0.1 mmole/g, the amount of supported cocatalyst may be low. If it exceeds 5 mmole/g, there may arise a problem that the catalyst component may be deactivated.

In a specific embodiment, the carrier supports all of the transition metal compounds represented by Formulae 4 to 6 and the cocatalyst compound.

Here, the total amount of the mixed transition metal compounds supported on a carrier may be 0.001 to 1 mmole based on 1 g of the carrier. When the content ratio of the mixed transition metal compounds and the carrier satisfies the above range, an appropriate level of activity of the supported catalyst may be exhibited, which is advantageous from the viewpoint of maintaining the activity of the catalyst and economical efficiency.

In addition, the total amount of the cocatalyst compound supported on a carrier may be 2 to 15 mmoles based on the 1 g of the carrier. When the content ratio of the cocatalyst compound and the carrier satisfies the above range, it is advantageous from the viewpoint of maintaining the activity of the catalyst and economical efficiency.

In a specific embodiment, one or two or more types of a carrier may be used. For example, all of the mixed transition metal compounds and the cocatalyst compound may be supported on one type of a carrier, or the mixed transition metal compounds and the cocatalyst compound may be supported on two or more types of a carrier, respectively. In addition, either one of the mixed transition metal compounds and the cocatalyst compound may be supported on a carrier.

As a method of supporting the mixture of transition metal compounds and/or the cocatalyst compound employed in a catalyst for olefin polymerization on the carrier, a physical adsorption method or a chemical adsorption method may be used.

In a specific embodiment, the physical adsorption method may be a method of contacting a solution in which mixed transition metal compounds have been dissolved with a carrier and then drying the same; a method of contacting a solution in which mixed transition metal compounds and a cocatalyst compound have been dissolved with a carrier and then drying the same; or a method of contacting a solution in which mixed transition metal compounds have been dissolved with a carrier and then drying the same to prepare the carrier that supports the mixed transition metal compounds, separately contacting a solution in which a cocatalyst compound has been dissolved with a carrier and then drying the same to prepare the carrier that supports the cocatalyst compound, and then mixing them.

In a specific embodiment, the chemical adsorption method may be a method of supporting a cocatalyst compound on the surface of a carrier, and then supporting mixed transition metal compounds on the cocatalyst compound; or a method of covalently bonding a functional group on the surface of a carrier (e.g., a hydroxy group (—OH) on the silica surface in the case of silica) with the mixed transition metal compounds.

Here, the solvent used in supporting the mixed transition metal compounds and/or the cocatalyst compound is not particularly limited. For example, the solvent may comprise at least one selected from the group consisting of aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran, acetone, and ethyl acetate.

In a specific embodiment, the procedure in which the mixed transition metal compounds and/or the cocatalyst compound are supported on the carrier in step (3') may be carried out at a temperature of 0 to 100° C., preferably at a temperature from room temperature to 90° C.

In addition, the procedure in which the mixed transition metal compounds and/or the cocatalyst compound are supported on the carrier in step (3') may be carried out as a mixture of the mixed transition metal compounds and/or the cocatalyst compound and the carrier is sufficiently stirred for 1 minute to 24 hours, preferably 5 minutes to 15 hours.

Catalyst for Olefin Polymerization

According to an embodiment of the present invention, there is provided a catalyst for olefin polymerization, which is prepared by the preparation process according to the embodiment of the present invention and comprises transition metal compounds represented by Formulae 4 to 6; and a cocatalyst compound comprising at least one selected from the group consisting of compounds represented by Formulae 7 to 9.

[Formula 4]

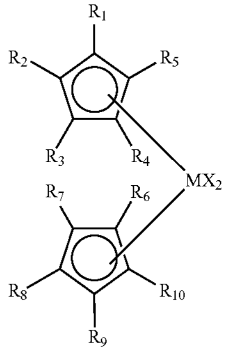

[Formula 5]

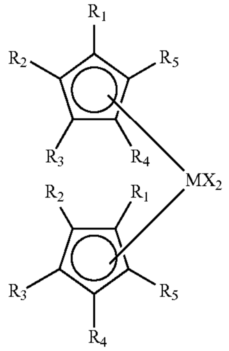

[Formula 6]

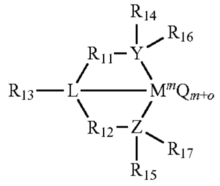

In Formulae 4 to 6, M, X, $R_1$ to $R_5$, and $R_6$ to $R_{10}$, $R_{11}$ to $R_{17}$, m, o, Q, Y, Z, and L are as described above in the section of the process for preparing a catalyst for olefin polymerization.

[Formula 7]

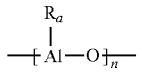

[Formula 8]

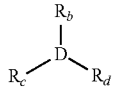

[Formula 9]

$[L—H]^+[Z(A)_4]^-$ or $[L]^+[Z(A)_4]^-$

In Formulae 7 to 9, n, D, L, Z, A, and $R_a$ to $R_d$ are as described above in the section of the process for preparing a catalyst for olefin polymerization.

In a specific embodiment, the catalyst for olefin polymerization may further comprise a carrier for supporting some or all of the transition metal compounds represented by Formulae 4 to 6 and the cocatalyst compound comprising at least one selected from the group consisting of compounds represented by Formulae 7 to 9.

Here, details on the transition metal compounds represented by Formulae 4 to 6, the cocatalyst compound comprising at least one selected from the group consisting of compounds represented by Formulae 7 to 9; and the carrier are as described above in the section of the process for preparing a catalyst for olefin polymerization.

Process for Preparing a Polyolefin

According to an embodiment of the present invention, there is provided a process for preparing a polyolefin, which comprises (1) dissolving a compound represented by Formula 1 and a compound represented by Formula 2 in a solvent; (2) adding a compound represented by Formula 3 to the solution obtained in step (1) and reacting it under stirring to obtain a mixture of transition metal compounds represented by Formulae 4 and 5; (3) activating the mixture of transition metal compounds obtained in step (2) and a transition metal compound represented by Formula 6 with a cocatalyst compound; (4) supporting some or all of the transition metal compounds represented by Formulae 4 to 6 and the cocatalyst compound on a carrier before or after step (3); and (5) polymerizing an olefin in the presence of the catalyst obtained in step (3) or step (4).

Details of steps (1) to (4) are substantially the same as steps (1) to (3) and (3') of the process for preparing a catalyst for olefin polymerization as described above.

In a specific embodiment, the process for preparing a polyolefin further comprise (2') drying the mixture of transition metal compounds obtained in step (2).

In a specific embodiment, the process for preparing a polyolefin may further comprise (2") dissolving the dried mixture of transition metal compounds obtained in step (2') in a solvent and then removing unreacted substances and/or impurities with a filter.

Here, details of steps (2') and (2") are substantially the same as steps (2') and (2") of the process for preparing a catalyst for olefin polymerization as described above.

Step (5)

An olefin is polymerized in the presence of the catalyst obtained in step (3) or step (4).

In a specific embodiment, the polymerization of an olefin may be a homopolymerization of an olefinic monomer or a copolymerization of an olefinic monomer and an olefinic comonomer. Preferably, the polymerization of an olefin is a copolymerization of an olefinic monomer and an olefinic comonomer.

In an exemplary embodiment, the olefinic monomer and olefinic comonomer are each at least one selected from the group consisting of an alpha-olefin having 2-20 carbon atoms, a diolefin having 1-20 carbon atoms, a cycloolefin having 3-20 carbon atoms, and a cyclodiolefin having 3-20 carbon atoms.

In an exemplary embodiment, the olefinic monomer may be ethylene, and the olefinic comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene, but they are not limited thereto.

In a specific embodiment, the polymerization of an olefin is a copolymerization of an olefinic monomer and an olefinic comonomer, wherein the olefinic monomer is ethylene, and the olefinic comonomer is 1-hexene, but they are not limited thereto.

In such an event, the content of ethylene is preferably 55 to 99.9% by weight, more preferably 90 to 99.9% by weight.

The content of the alpha-olefinic comonomer is preferably 0.1 to 45% by weight, more preferably 0.1 to 10% by weight.

In a specific embodiment, the polymerization of an olefin may be a polymerization reaction such as free radical, cationic, coordination, condensation, and addition, but it is not limited thereto.

In an exemplary embodiment, the polymerization of an olefin may be carried out by, for example, gas-phase polymerization, solution polymerization, or slurry polymerization, but is not limited thereto. Preferably, the polymerization of an olefin may be carried out by gas-phase polymerization.

When the polymerization of an olefin is carried out by a solution polymerization method or a slurry polymerization method, examples of a solvent that may be used include $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

Polyolefin

According to an embodiment of the present invention, there is provided a polyolefin, which is prepared by the preparation process according to the embodiment of the present invention and has (1) a density of 0.940 to 0.970 g/cm$^3$, (2) a melt index ratio ($MI_{21.6}/MI_{2.16}$) of 30 to 200, (3) a weight average molecular weight (Mw) of 80,000 to 600,000 g/mole, and (4) molecular weight distribution (MWD) represented by a polydispersity index (Mw/Mn) of 10 to 50.

In a specific embodiment, the polyolefin may be a homopolymer of an olefinic monomer or a copolymer of an olefinic monomer and an olefinic comonomer.

In an exemplary embodiment, the polyolefin may be a copolymer of an olefinic monomer and an olefinic comonomer. Specifically, the polyolefin may be a copolymer of ethylene and an alpha-olefinic comonomer having 3 to 20 carbon atoms. More specifically, the olefinic monomer may be ethylene, and the alpha-olefinic comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

In an exemplary embodiment, the polyolefin may be a high-density polyethylene in which the olefinic monomer is ethylene, and the olefinic comonomer is 1-hexene, but it is not limited thereto.

The polyolefin according to an embodiment of the present invention has a density of 0.940 to 0.970 g/cm$^3$. Preferably, the density of the polyolefin is in the range of 0.940 to 0.965 g/cm$^3$, more preferably 0.945 to 0.960 g/cm$^3$.

In addition, the polyolefin has a melt index ratio ($MI_{21.6}/MI_{21.6}$) of 30 to 200. Preferably, the melt index ratio of the polyolefin is in the range of 50 to 200, more preferably 70 to 200.

In addition, the polyolefin has a weight average molecular weight (Mw) of 80,000 to 600,000 g/mole. Preferably, the weight average molecular weight (Mw) of the polyolefin is 200,000 to 500,000 g/mole.

In addition, the polyolefin has a molecular weight distribution (MWD) represented as a polydispersity index (Mw/Mn) of 10 to 50. Preferably, the molecular weight distribution represented as a polydispersity index of the polyolefin is 20 to 50.

The polyolefin according to an embodiment of the present invention may prevent phase separation of the molecular structure and have a bimodal or multi-modal molecular weight distribution. Therefore, it can have excellent processability and mechanical properties.

EMBODIMENTS FOR CARRYING OUT THE INVENTION

Example

Hereinafter, the present invention will be described in detail with reference to Examples. However, the following examples are intended to further illustrate the present invention. The scope of the present invention is not limited thereto only.

Preparation Example: Preparation of Mixed Transition Metal Compounds

Preparation Example 1

281 mg (2.46 mmoles, 7 eq.) of lithium n-propylcyclopentadienide of Formula 1-1 and 60 mg (0.42 mmole, 1.2 eq.) of lithium pentamethylcyclopentadienide of Formula 2-1 were dissolved in 30 ml of toluene at 25° C. This solution was cooled to −30° C., and 328 mg (1.41 mmoles, 4 eq.) of zirconium chloride ($ZrCl_4$) was slowly added thereto. The temperature of the reaction mixture was gradually raised to room temperature, and the temperature was raised to 70° C., followed by stirring for 24 hours. Upon completion of the reaction, lithium chloride (LiCl) was removed with a Celite filter, and the product was dried to obtain 459 mg (yield: 86%) of a mixture of transition metal compounds.

The structure of the mixed (1:3) transition metal compounds of the compound of Formula 4-1 ((pentamethylcyclopentadienyl)(n-propylcyclopentadienyl) zirconium dichloride) and the compound of Formula 5-1 (bis(n-propylcyclopentadienyl) zirconium dichloride) was confirmed by $^1$H NMR.

$^1$H-NMR ($CDCl_3$, 300 MHz) 6.28 (t, 12H), 6.19 (t, 12H), 6.02 (t, 2H), 5.94 (t, 2H), 2.60 (t, 14H), 2.02 (s, 15H), 1.64-1.52 (m, 14H), 0.93 (t, 20H).

Preparation Example 2

441 mg (3.87 mmoles, 11 eq.) of lithium n-propylcyclopentadienide of Formula 1-1 and 60 mg (0.42 mmole, 1.2 eq.) of lithium pentamethylcyclopentadienide of Formula 2-1 were dissolved in 50 ml of toluene at 25° C. This solution was cooled to −30° C., and 492 mg (2.11 mmoles, 6 eq.) of zirconium chloride was slowly added thereto. The temperature of the reaction mixture was gradually raised to room temperature, and the temperature was raised to 70° C., followed by stirring for 24 hours. Upon completion of the reaction, lithium chloride was removed with a Celite filter, and the product was dried to obtain 675 mg (yield: 84%) of a mixture of transition metal compounds.

The structure of the mixed (1:5) transition metal compounds of the compound of Formula 4-1 and the compound of Formula 5-1 was confirmed by $^1$H NMR.

$^1$H-NMR ($CDCl_3$, 300 MHz) 6.28 (t, 20H), 6.19 (t, 20H), 6.02 (t, 2H), 5.94 (t, 2H), 2.60 (t, 22H), 2.02 (s, 15H), 1.64-1.52 (m, 22H), 0.93 (t, 32H).

Example: Preparation of a Catalyst for Olefin Polymerization

Example 1

1.1 mg of the mixture of transition metal compounds prepared in Preparation Example 1 and 5.3 mg of the compound of Formula 6-1 ({[(2,4,6-$Me_3C_6H_2$)$NCH_2CH_2$]$_2NH$}Zr($CH_2Ph$)$_2$) were mixed with 6.9 g of a toluene solution of 10% by weight of methylaluminumoxane (MAO) (Al/Zr=120) in a glove box, which was stirred at room temperature for 1 hour. A 100-ml flask was charged with 2.0 g of silica (ES70), followed by the addition of 50 ml of purified toluene thereto. The solution of mixed transition metal compounds obtained above was injected into the silica slurry, which was stirred in an oil bath at 25° C. for 3 hours. Upon completion of the supporting, when the solid/liquid was sufficiently separated, the supernatant was removed. The supported catalyst was washed three times with toluene and dried at 25° C. under vacuum for 30 minutes to obtain 2.5 g of a free-flowing powder.

Comparative Example 1

1.1 mg of the compound of Formula 5-1 (bis(n-propylcyclopentadienyl) zirconium dichloride) and 5.3 mg of the compound of Formula 6-1 were mixed with 6.9 g of a toluene solution of 10% by weight of methylaluminumoxane (MAO) (Al/Zr=120) in a glove box, which was stirred at room temperature for 1 hour. A 100-ml flask was charged with 2.0 g of silica (ES70), followed by the addition of 50 ml of purified toluene thereto. The solution of mixed transition metal compounds obtained above was injected into the silica slurry, which was stirred in an oil bath at 25° C. for 3 hours. Upon completion of the supporting, when the solid/liquid was sufficiently separated, the supernatant was removed. The supported catalyst was washed three times with toluene and dried at 25° C. under vacuum for 30 minutes to obtain 2.5 g of a free-flowing powder.

Comparative Example 2

2.5 g of a free-flowing powder was obtained in the same manner as in Preparation Example 2-3, except that 1.2 mg of the compound of Formula 4-1 ((pentamethylcyclopentadienyl)(n-propylcyclopentadienyl) zirconium dichloride) and 7.9 mg of the compound of Formula 6-1 were used.

Test Example

Polyolefins were each prepared in a fluidized-bed gas-phase reactor using each of the supported catalysts obtained in the Example and Comparative Examples. Specifically, ethylene and 1-hexene were copolymerized for 1 hour in the presence of 50 mg of each of the supported catalysts obtained in the Example and Comparative Examples and 0.6 ml of 1 M triisobutyl aluminum (TIBAL) as a scavenger. The temperature inside the reactor was maintained at about 85° C., the pressure of ethylene was 14 kgf/cm$^2$, and the initial injection amount of 1-hexene was 10 ml. Hydrogen was added for controlling the molecular weight of the polymer. The polymerization conditions are summarized in Table 1 below.

The physical properties of the polyolefins prepared using the supported catalyst in each of the Example and Comparative Examples were measured, as follows. The results are shown in Table 2 and FIG. 1.

(1) Density

It was measured in accordance with ASTM D1505.

(2) Melt Index and Melt Flow Ratio (MFR)

It was measured at 190° C. under a load of 21.6 kg and 2.16 kg in accordance with ASTM D1238. Their ratio ($MI_{21.6}/MI_{2.16}$) was calculated.

(3) Molecular Weight and Molecular Weight Distribution

It was measured using gel permeation chromatography-FTIR (GPC-FTIR).

TABLE 1

| | Catalyst (mg) | $H_2$ (cc/min.) | 1-hexene (cc) | Catalytic activity (gPE/gCat-hr) |
|---|---|---|---|---|
| Ex. 1 | 50 | 20 | 10 | 1,420 |
| | 50 | 30 | 10 | 1,086 |
| C. Ex. 1 | 50 | 20 | 10 | 796 |
| | 50 | 30 | 10 | 686 |
| C. Ex. 2 | 50 | 20 | 10 | 730 |
| | 50 | 30 | 10 | 644 |

TABLE 2

| | Density (g/cm3) | $I_{2.16}$ (g/10 min) | $I_{21.6}$ (g/10 min) | MFR | Mw (g/mole) | MWD |
|---|---|---|---|---|---|---|
| Ex. 1 | 0.960 | 1.80 | 293 | 163 | 179,860 | 41 |
| | 0.956 | 1.96 | 187 | 95 | 191,596 | 45 |
| C. Ex. 1 | 0.958 | 0.28 | 46 | 163 | 172,497 | 12 |
| | 0.956 | 0.57 | 43 | 75 | 255,686 | 22 |
| C. Ex. 2 | 0.958 | 0.28 | 33 | 118 | 249,335 | 30 |
| | 0.958 | 0.40 | 34 | 85 | 225,256 | 35 |

As can be seen from Table 2 above and FIG. 1, the polyolefin obtained in the Example showed a similar distribution near a high molecular weight of log Mw of 6-7, while having a relatively large MFR, when compared with the polyolefins obtained in the Comparative Examples. In particular, the polyolefin of the Example had a large MWD and greatly increased $I_{21.6}$ as compared with the polyolefin of the Comparative Examples. Therefore, its processability can be improved even when the weight average molecular weights are similar.

INDUSTRIAL APPLICABILITY

The polyolefin according to an embodiment of the present invention may prevent phase separation of the molecular structure, whereby it does not have non-uniform parts such as stains or cracks upon film molding. Since it has a bimodal or multi-modal molecular weight distribution, it can have excellent processability and physical properties.

The invention claimed is:

1. A process for preparing a catalyst for olefin polymerization, which comprises (1) dissolving a compound of Formula 1 and a compound of Formula 2 in a solvent; (2) adding a compound of Formula 3 to the solution obtained in step (1) and reacting it under stirring to obtain a mixture of transition metal compounds of Formulae 4 and 5; and (3) activating the mixture of transition metal compounds obtained in step (2) and a transition metal compound of Formula 6 with a cocatalyst compound:

[Formula 1]

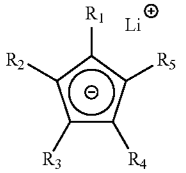

[Formula 2]

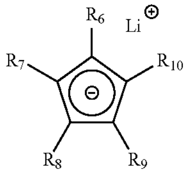

[Formula 3]

$MX_4$

[Formula 4]

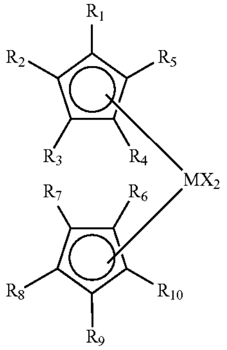

[Formula 5]

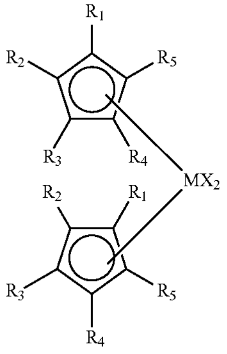

[Formula 6]

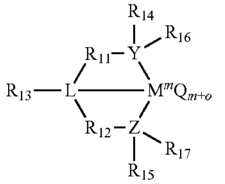

in Formulae 1 to 6, $R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl, wherein $R_1$ to $R_5$ and $R_6$ to $R_{10}$ are each independently capable of being linked to an adjacent group to form a substituted or unsubstituted, saturated or unsaturated $C_{4-20}$ ring, M is each titanium (Ti), zirconium (Zr), or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, Q is an anionic leaving group and is each independently hydrogen, hydrocarbyl, heteroatom or halogen, a straight or branched chain alkyl radical, an alkenyl radical, an alkynyl radical, a cycloalkyl radical or an aryl radical, an acyl radical, an aroyl radical, an alkoxy radical, an aryloxy radical, an alkylthio radical, a dialkylamino radical, an alkoxycarbonyl radical, an aryloxycarbonyl radical, a carbomoyl radical, an alkyl- or dialkyl-carbamoyl radical, an acyloxy radical, an acylamino radical, an aroylamino radical, a straight-chain, branched-chain or cyclic alkylene radical, or a combination thereof, m is the oxidation state of M and is +3, +4, or +5, is the formal charge of the YZL ligand and is 0, −1, −2, or −3, L is nitrogen, Y is nitrogen or phosphorus, Z is nitrogen or phosphorus, $R_{11}$ and $R_{12}$ are each independently a $C_{1-20}$ hydrocarbon group or a heteroatom-containing group, wherein the hetero atom is silicon, germanium, tin, lead, or phosphorus, or $R_{11}$ and $R_{12}$ are capable of being linked to each other, $R_{13}$ is absent or is hydrogen, $C_{1-20}$ alkyl, halogen, or a heteroatom-containing group, $R_{14}$ and $R_{15}$ are each independently an alkyl group, an aryl group, a substituted aryl group, a cyclic alkyl group, a substituted cyclic alkyl group, or a multiple ring system, and $R_{16}$ and $R_{17}$ are each independently absent, or hydrogen, an alkyl group, a halogen, a heteroatom, a hydrocarbyl group, or a heteroatom-containing group.

2. The process for preparing a catalyst for olefin polymerization of claim 1, wherein $R_1$ to $R_5$ and $R_6$ to $R_{10}$ are each hydrogen, substituted or unsubstituted $C_{1-20}$ alkyl, substituted or unsubstituted $C_{2-20}$ alkenyl, or substituted or unsubstituted $C_{6-20}$ aryl.

3. The process for preparing a catalyst for olefin polymerization of claim 1, wherein $R_1$ to $R_5$ and $R_6$ to $R_{10}$ are each substituted with at least one of halogen, $C_{1-20}$ alkylsilyl, and $C_{1-20}$ alkenyloxy.

4. The process for preparing a catalyst for olefin polymerization of claim 1, wherein the compound of Formula 1 is at least one of the compounds of Formulae 1-1 to 1-21, and the compound of Formula 2 is at least one of compounds of Formulae 2-1 to 2-7:

[Formula 1-1]

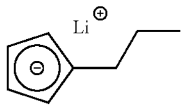

[Formula 1-2]

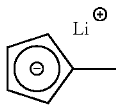

-continued
[Formula 1-3]
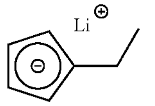
[Formula 1-4]
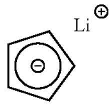
[Formula 1-5]
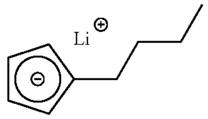
[Formula 1-6]
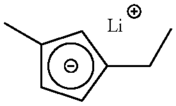
[Formula 1-7]
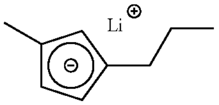
[Formula 1-8]
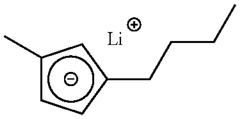
[Formula 1-9]
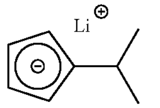
[Formula 1-10]
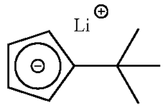
[Formula 1-11]
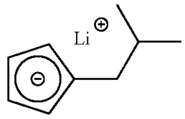
[Formula 1-12]
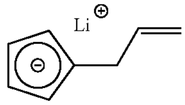
[Formula 1-13]
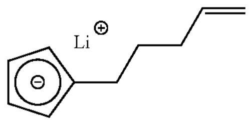
[Formula 1-14]
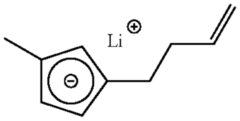
-continued
[Formula 1-15]
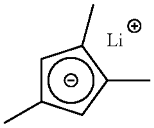
[Formula 1-16]
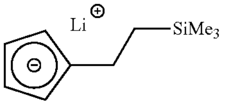
[Formula 1-17]
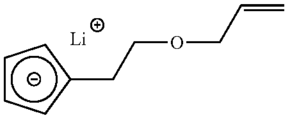
[Formula 1-18]
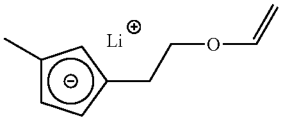
[Formula 1-19]
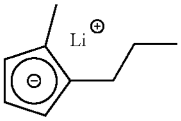
[Formula 1-20]
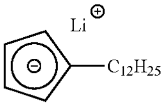
[Formula 1-21]
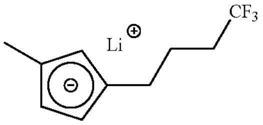
[Formula 2-1]
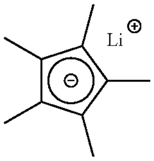
[Formula 2-2]
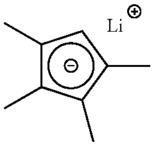
[Formula 2-3]
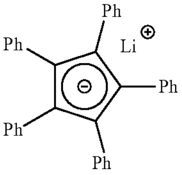
[Formula 2-4]
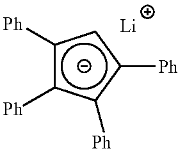

-continued
[Formula 2-5]
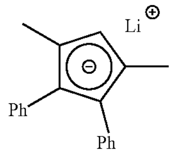
[Formula 2-6]
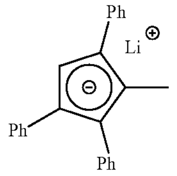
[Formula 2-7]
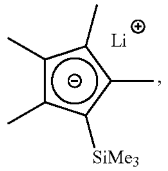
and
wherein the transition metal compound of Formula 4 is at least one of transition metal compounds of Formulae 4-1 to 4-21, and the transition metal compound of Formula 5 is at least one of transition metal compounds of Formulae 5-1 to 5-21:
[Formula 4-1]
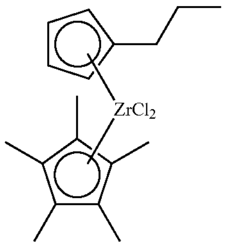
[Formula 4-2]
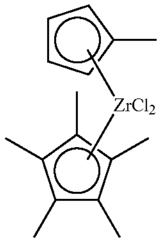
[Formula 4-3]
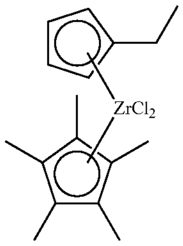
-continued
[Formula 4-4]
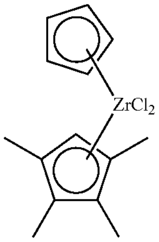
[Formula 4-5]
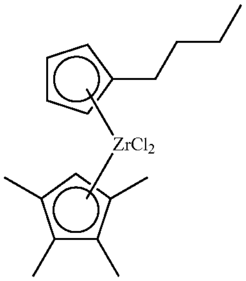
[Formula 4-6]
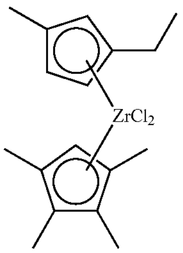
[Formula 4-7]
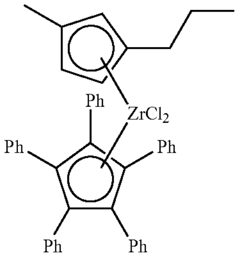
[Formula 4-8]
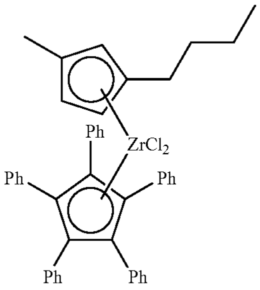
[Formula 4-9]
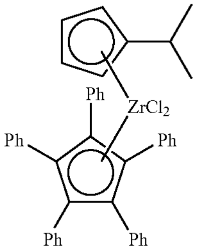

-continued
[Formula 4-10]
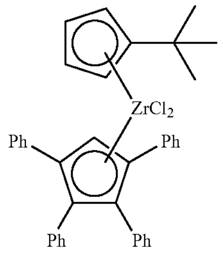
[Formula 4-11]
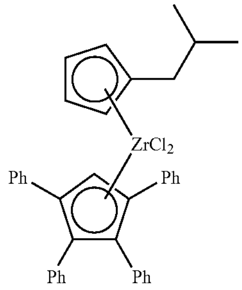
[Formula 4-12]
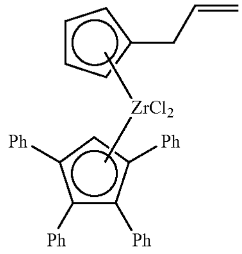
[Formula 4-13]
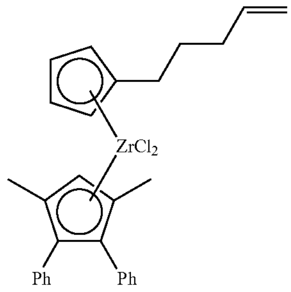
[Formula 4-14]
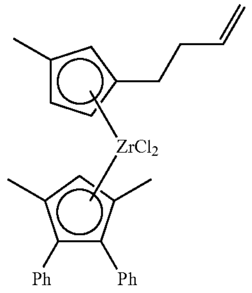
-continued
[Formula 4-15]
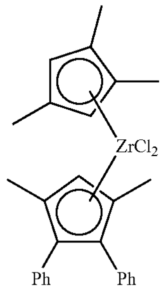
[Formula 4-16]
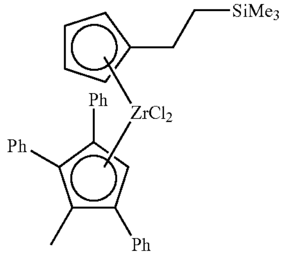
[Formula 4-17]
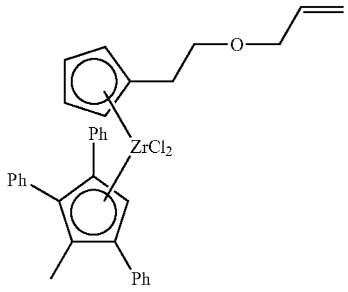
[Formula 4-18]
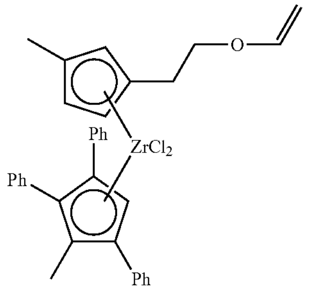
[Formula 4-19]
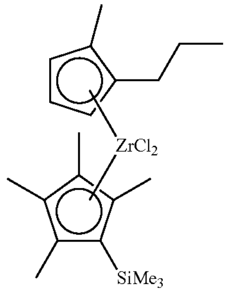

-continued
[Formula 4-20]
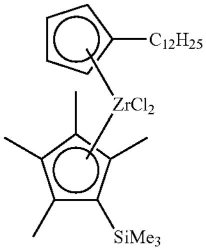
[Formula 4-21]
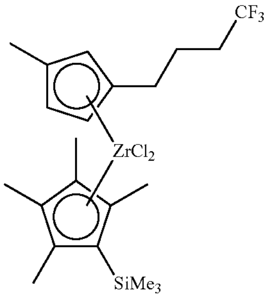
[Formula 5-1]
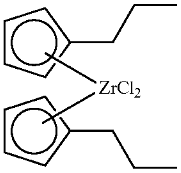
[Formula 5-2]
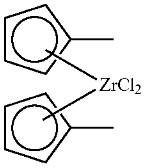
[Formula 5-3]
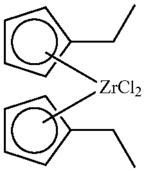
[Formula 5-4]
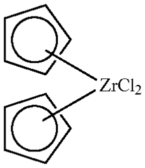
[Formula 5-5]
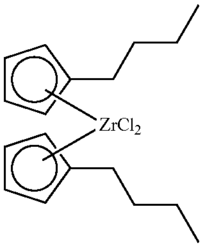
-continued
[Formula 5-6]
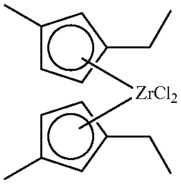
[Formula 5-7]
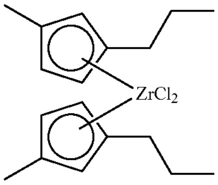
[Formula 5-8]
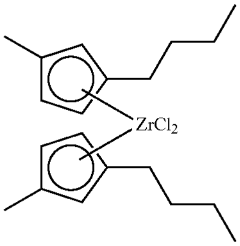
[Formula 5-9]
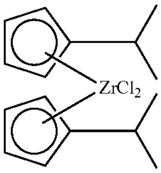
[Formula 5-10]
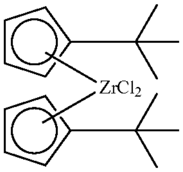
[Formula 5-11]
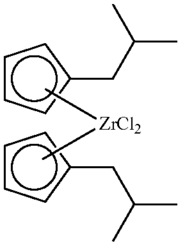
[Formula 5-12]
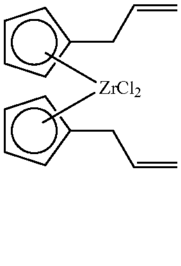

-continued

[Formula 5-13]

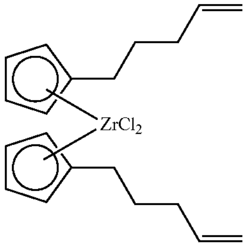

[Formula 5-14]

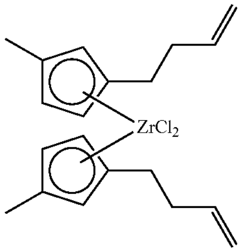

[Formula 5-15]

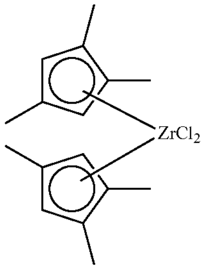

[Formula 5-16]

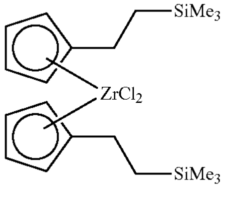

[Formula 5-17]

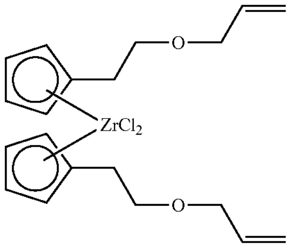

[Formula 5-18]

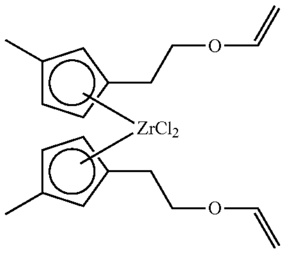

-continued

[Formula 5-19]

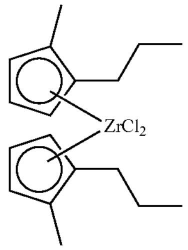

[Formula 5-20]

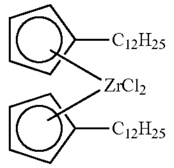

[Formula 5-21]

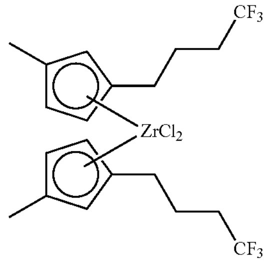

in the above formulae, Me is methyl, and Ph is phenyl.

5. The process for preparing a catalyst for olefin polymerization of claim 1, wherein the solvent comprises at least one selected from the group consisting of hexane, pentane, toluene, benzene, dichloromethane, diethyl ether, tetrahydrofuran, acetone, and ethyl acetate.

6. The process for preparing a catalyst for olefin polymerization of claim 1, wherein in step (1), the molar ratio of the compound of Formula 1 to the compound of Formula 2 is in the range of 1:100 to 100:1, and wherein the molar ratio of the compound of Formula 4 to the compound of Formula 5 in the mixture of transition metal compounds obtained in step (2) is in the range of 1:100 to 100:1.

7. The process for preparing a catalyst for olefin polymerization of claim 1, wherein in Formula 3, M is zirconium or hafnium, and X is each halogen or $C_{1-20}$ alkyl.

8. The process for preparing a catalyst for olefin polymerization of claim 7, wherein the compound represented by Formula 3 is $ZrCl_4$ or $HfCl_4$.

9. The process for preparing a catalyst for olefin polymerization of claim 1, wherein in step (2), the reaction temperature is 0° C. to 120° C., and the reaction time is 1 to 72 hours.

10. The process for preparing a catalyst for olefin polymerization of claim 1, which further comprises (2') drying the mixture of transition metal compounds obtained in step (2), wherein the process further comprises (2") dissolving the dried mixture of transition metal compounds obtained in step (2') in a solvent and then removing unreacted substances and/or impurities with a filter.

11. The process for preparing a catalyst for olefin polymerization of claim 1, wherein in Formula 6, M is zirconium or hafnium, Q is each independently hydrogen, a halogen, or a hydrocarbyl group, $R_{11}$ and $R_{12}$ are each independently a $C_{1-6}$ hydrocarbon group, $R_{13}$ is hydrogen or methyl, and $R_{14}$ and $R_{15}$ are each independently a substituted aryl group.

12. The process for preparing a catalyst for olefin polymerization of claim 11, wherein the transition metal compound of Formula 6 is a transition metal compound of Formula 6-1:

[Formula 6-1]

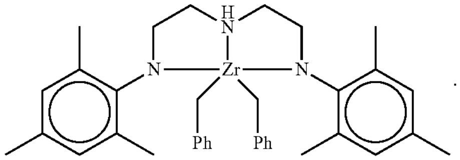

13. The process for preparing a catalyst for olefin polymerization of claim 1, wherein the cocatalyst compound comprises at least one selected from the group consisting of a compound of Formula 7, a compound of Formula 8, and a compound of Formula 9:

[Formula 7]

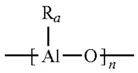

[Formula 8]

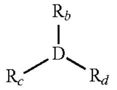

[Formula 9]

$[L—H]^+[Z(A)_4]^-$ or $[L]^+[Z(A)_4]^-$ in Formula 7, n is an integer of 2 or more, and $R_a$ may each independently be a halogen atom, $C_{1-20}$ hydrocarbon, or $C_{1-20}$ hydrocarbon substituted with halogen, in Formula 8, D is aluminum (Al) or boron (B), and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 9, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

14. The process for preparing a catalyst for olefin polymerization of claim 13, wherein the compound of Formula 7 is at least one selected from the group consisting of methylaluminoxane, ethylaluminoxane, isobutylaluminoxane, and butylaluminoxane, wherein the compound of Formula 8 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron, and wherein the compound of Formula 9 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl) borate, trimethylammonium tetra(o,p-dimethylphenyl) borate, tributylammonium tetra(p-trifluoromethylphenyl) borate, trimethylammonium tetra(p-trifluoromethylphenyl) borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl) aluminate, tripropylammonium tetra(p-tolyl) aluminate, triethylammonium tetra(o,p-dimethylphenyl) aluminate, tributylammonium tetra(p-trifluoromethylphenyl) aluminate, trimethylammonium tetra(p-trifluoromethylphenyl) aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl) borate, triethylammonium tetra(o,p-dimethylphenyl) borate, triphenylcarbonium tetra(p-trifluoromethylphenyl) borate, and triphenylcarbonium tetrapentafluorophenylborate.

15. The process for preparing a catalyst for olefin polymerization of claim 1, which further comprise (3') supporting some or all of the transition metal compounds of Formulae 4 to 6 and the cocatalyst compound on a carrier before or after step (3), wherein the carrier comprises at one or more selected from the group consisting of silica, alumina, and magnesia.

16. A catalyst for olefin polymerization, which is prepared by the preparation process of claim 1 and comprises transition metal compounds of Formulae 4 to 6; and a cocatalyst compound comprising one or more selected from the group consisting of the compounds of Formulae 7 to 9;

[Formula 7]

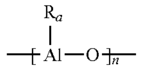

[Formula 8]

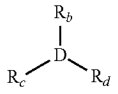

[Formula 9]

$[L—H]^+[Z(A)_4]^-$ or $[L]^+[Z(A)_4]^-$ in Formula 7, n is an integer of 2 or more, and $R_a$ may each independently be a halogen atom, $C_{1-20}$ hydrocarbon, or $C_{1-20}$ hydrocarbon substituted with halogen, in Formula 8, D is aluminum (Al) or boron (B), and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 9, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

17. The catalyst for olefin polymerization of claim 16, which further comprises a carrier for supporting some or all of the transition metal compounds of Formulae 4 to 6 and the cocatalyst compound comprising one or more selected from the group consisting of the compounds of Formulae 7 to 9.

18. A process for preparing a polyolefin, which comprises (1) dissolving a compound of Formula 1 and a compound of Formula 2 in a solvent; (2) adding a compound of Formula 3 to the solution obtained in step (1) and reacting it under stirring to obtain a mixture of transition metal compounds of Formulae 4 and 5; (3) activating the mixture of transition metal compounds obtained in step (2) and a transition metal compound of Formula 6 with a cocatalyst compound; (4) supporting some or all of the transition metal compounds of Formulae 4 to 6 and the cocatalyst compound on a carrier before or after step (3); and (5) polymerizing an olefin in the presence of the catalyst obtained in step (3) or step (4):

[Formula 1]

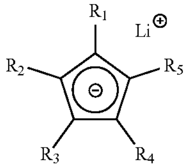

[Formula 2]

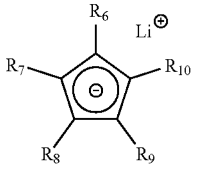

[Formula 3]

$MX_4$

[Formula 4]

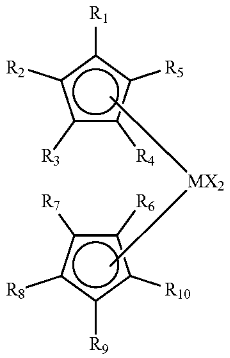

[Formula 5]

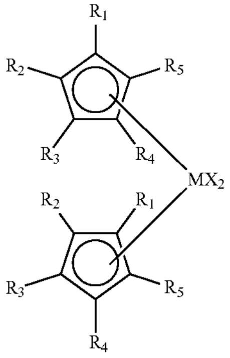

-continued

[Formula 6]

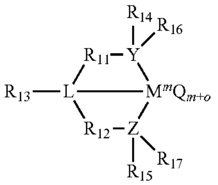

in Formulae 1 to 6, $R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl, wherein $R_1$ to $R_5$ and $R_6$ to $R_{10}$ are each independently capable of being linked to an adjacent group to form a substituted or unsubstituted, saturated or unsaturated $C_{4-20}$ ring, M is each titanium (Ti), zirconium (Zr), or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, Q is an anionic leaving group and is each independently hydrogen, hydrocarbyl, heteroatom or halogen, a straight or branched chain alkyl radical, an alkenyl radical, an alkynyl radical, a cycloalkyl radical or an aryl radical, an acyl radical, an aroyl radical, an alkoxy radical, an aryloxy radical, an alkylthio radical, a dialkylamino radical, an alkoxycarbonyl radical, an aryloxycarbonyl radical, a carbomoyl radical, an alkyl- or dialkyl-carbamoyl radical, an acyloxy radical, an acylamino radical, an aroylamino radical, a straight-chain, branched-chain or cyclic alkylene radical, or a combination thereof, m is the oxidation state of M and is +3, +4, or +5, is the formal charge of the YZL ligand and is 0, −1, −2, or −3, L is nitrogen, Y is nitrogen or phosphorus, Z is nitrogen or phosphorus, $R_{11}$ and $R_{12}$ are each independently a $C_{1-20}$ hydrocarbon group or a heteroatom-containing group, wherein the hetero atom is silicon, germanium, tin, lead, or phosphorus, or Ru and $R_{12}$ are capable of being linked to each other, $R_{13}$ is absent or is hydrogen, $C_{1-20}$ alkyl, halogen, or a heteroatom-containing group, $R_{14}$ and $R_{15}$ are each independently an alkyl group, an aryl group, a substituted aryl group, a cyclic alkyl group, a substituted cyclic alkyl group, or a multiple ring system, and $R_{16}$ and $R_{17}$ are each independently absent, or hydrogen, an alkyl group, a halogen, a heteroatom, a hydrocarbyl group, or a heteroatom-containing group.

19. The process for preparing a polyolefin of claim 18, wherein the polymerization of an olefin is a copolymerization of an olefinic monomer and an olefinic comonomer, wherein the olefinic monomer is ethylene, and the olefinic comonomer is 1-hexene.

20. A polyolefin, which is prepared by the preparation process of claim 18 and has (1) a density of 0.940 to 0.970 $g/cm^3$, (2) a melt index ratio ($MI_{21.6}/MI_{2.16}$) of 30 to 200, (3) a weight average molecular weight (Mw) of 80,000 to 600,000 g/mole, and (4) molecular weight distribution (MWD) represented by a polydispersity index (Mw/Mn) of 10 to 50.

* * * * *